United States Patent
Eagleman et al.

(10) Patent No.: US 11,614,802 B2
(45) Date of Patent: *Mar. 28, 2023

(54) METHOD AND SYSTEM FOR HAPTIC STIMULATION

(71) Applicant: NeoSensory, Inc., Houston, TX (US)

(72) Inventors: David M. Eagleman, Houston, TX (US); Michael V. Perrotta, Houston, TX (US); Scott Novich, Houston, TX (US); Abhipray Sahoo, Houston, TX (US)

(73) Assignee: NeoSensory, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,465

(22) Filed: Jun. 28, 2021

(65) Prior Publication Data

US 2021/0325969 A1    Oct. 21, 2021

Related U.S. Application Data

(63) Continuation of application No. 17/144,076, filed on Jan. 7, 2021, now Pat. No. 11,079,854.

(60) Provisional application No. 63/104,944, filed on Oct. 23, 2020, provisional application No. 63/043,675, filed on Jun. 24, 2020, provisional application No. 62/958,169, filed on Jan. 7, 2020.

(51) Int. Cl.
*G06F 3/01* (2006.01)
*G08B 6/00* (2006.01)
*G06F 3/16* (2006.01)

(52) U.S. Cl.
CPC ............... *G06F 3/016* (2013.01); *G06F 3/16* (2013.01); *G08B 6/00* (2013.01)

(58) Field of Classification Search
CPC .............. G06F 3/016; G06F 3/16; G08B 6/00
See application file for complete search history.

(56) References Cited

U.S. PATENT DOCUMENTS

| 3,342,923 A | 9/1967 | Henley |
| 4,255,801 A | 3/1981 | Ode et al. |
| 4,354,064 A | 10/1982 | Scott |

(Continued)

FOREIGN PATENT DOCUMENTS

| CN | 104011794 A | 8/2014 |
| CN | 105739674 A | 7/2016 |

(Continued)

OTHER PUBLICATIONS

Conlon, Brendan, et al., "Biomodal neuromodulation combining sound and tongue stimulation reduces tinnitus symptoms in a large randomized clinical study", Science Translational Medicine, Research Article, 12, eabb2830 (2020) Oct. 7, 2020.

(Continued)

*Primary Examiner* — David E Choi
(74) *Attorney, Agent, or Firm* — Jeffrey Schox; Caitlin Ploch

(57) ABSTRACT

A method for haptic stimulation includes any or all of: receiving an audio input; determining a set of parameters based on the audio input; determining a set of stimulation locations based on a collective set of energy parameters; assigning a vibration intensity to a set of one or more haptic actuators; and stimulating a user at the set of haptic locations based on the vibration intensities. A system for haptic stimulation includes an actuation subsystem having a set of actuators.

16 Claims, 9 Drawing Sheets

(56) References Cited

U.S. PATENT DOCUMENTS

| | | |
|---|---|---|
| 4,581,491 A | 4/1986 | Boothroyd |
| 4,665,494 A | 5/1987 | Tanaka et al. |
| 4,926,879 A | 5/1990 | Sevrain et al. |
| 5,553,148 A | 9/1996 | Werle |
| 5,655,271 A | 8/1997 | Maxwell-Trumble et al. |
| 6,027,463 A | 2/2000 | Moriyasu |
| 6,155,971 A | 12/2000 | Calhoun et al. |
| 6,155,995 A | 12/2000 | Lin |
| 6,272,466 B1 | 8/2001 | Harada et al. |
| 6,295,703 B1 | 10/2001 | Adams et al. |
| 6,671,618 B2 | 12/2003 | Hoisko |
| 7,146,218 B2 | 12/2006 | Esteller et al. |
| 7,222,075 B2 | 5/2007 | Petrushin |
| 7,232,948 B2 | 6/2007 | Zhang |
| 7,921,069 B2 | 4/2011 | Canny et al. |
| 7,979,146 B2 | 7/2011 | Ullrich et al. |
| 8,005,681 B2 | 8/2011 | Hovestadt et al. |
| 8,068,025 B2 | 11/2011 | Devenyi et al. |
| 8,588,464 B2 | 11/2013 | Albertson et al. |
| 8,724,841 B2 | 5/2014 | Bright et al. |
| 8,754,757 B1 | 6/2014 | Ullrich et al. |
| 8,952,888 B2 | 2/2015 | Van Den Eerenbeemd et al. |
| 9,019,087 B2 | 4/2015 | Bakircioglu et al. |
| 9,064,387 B2 | 6/2015 | Bhatia et al. |
| 9,104,271 B1 | 8/2015 | Adams et al. |
| 9,124,979 B2 | 9/2015 | Ogrady et al. |
| 9,147,328 B2 | 9/2015 | Ioffreda et al. |
| 9,298,260 B2 | 3/2016 | Karaoguz et al. |
| 9,317,116 B2 | 4/2016 | Ullrich et al. |
| 9,324,320 B1 | 4/2016 | Stolcke et al. |
| 9,345,433 B1 | 5/2016 | Shinozuka et al. |
| 9,368,005 B2 | 6/2016 | Cruz-Hernandez et al. |
| 9,443,410 B1 | 9/2016 | Constien |
| 9,474,683 B1 | 10/2016 | Mortimer et al. |
| 9,613,619 B2 | 4/2017 | Lev-Tov et al. |
| 9,626,845 B2 | 4/2017 | Eagleman et al. |
| 9,659,384 B2 | 5/2017 | Shaji et al. |
| 9,682,232 B2 | 6/2017 | Shore et al. |
| 9,714,075 B2 | 7/2017 | Watkins et al. |
| 9,735,364 B2 | 8/2017 | Cheng et al. |
| 9,760,171 B2 | 9/2017 | Cruz-Hernandez et al. |
| 9,781,392 B2 | 10/2017 | Sahay et al. |
| 9,905,090 B2 | 2/2018 | Ullrich et al. |
| 9,987,962 B1 | 6/2018 | Salter et al. |
| 10,258,790 B2 | 4/2019 | Guarraia et al. |
| 10,642,362 B2 | 5/2020 | Eagleman et al. |
| 10,685,666 B2 | 6/2020 | Maziewski et al. |
| 10,739,852 B2 | 8/2020 | Amstutz |
| 2002/0090100 A1 | 7/2002 | Thiede et al. |
| 2002/0111737 A1 | 8/2002 | Hoisko |
| 2002/0194002 A1 | 12/2002 | Petrushin |
| 2003/0025595 A1 | 2/2003 | Langberg |
| 2003/0067440 A1 | 4/2003 | Rank |
| 2003/0117371 A1 | 6/2003 | Roberts et al. |
| 2003/0151597 A1 | 8/2003 | Roberts et al. |
| 2003/0158587 A1 | 8/2003 | Esteller et al. |
| 2003/0179190 A1* | 9/2003 | Franzen .................. G06F 3/016 |
| | | 345/173 |
| 2005/0113167 A1 | 5/2005 | Buchner et al. |
| 2005/0192514 A1 | 9/2005 | Kearby et al. |
| 2007/0041600 A1 | 2/2007 | Zachman |
| 2007/0242040 A1 | 10/2007 | Ullrich et al. |
| 2008/0120029 A1 | 5/2008 | Zelek et al. |
| 2008/0140422 A1 | 6/2008 | Hovestadt et al. |
| 2008/0170118 A1 | 7/2008 | Albertson et al. |
| 2009/0006363 A1 | 1/2009 | Canny et al. |
| 2009/0012638 A1 | 1/2009 | Lou |
| 2009/0096632 A1 | 4/2009 | Ullrich et al. |
| 2010/0249637 A1 | 9/2010 | Walter et al. |
| 2010/0302033 A1 | 12/2010 | Devenyi et al. |
| 2010/0318007 A1 | 12/2010 | Obrien |
| 2011/0009921 A1 | 1/2011 | Tass et al. |
| 2011/0061017 A1 | 3/2011 | Ullrich et al. |
| 2011/0063208 A1 | 3/2011 | Van et al. |
| 2011/0105967 A1 | 5/2011 | Zeng et al. |
| 2011/0202155 A1 | 8/2011 | Ullrich et al. |
| 2011/0202337 A1 | 8/2011 | Fuchs et al. |
| 2011/0221694 A1 | 9/2011 | Karaoguz et al. |
| 2011/0319796 A1 | 12/2011 | Campdera |
| 2012/0023785 A1 | 2/2012 | Barnes et al. |
| 2012/0046579 A1 | 2/2012 | Radl et al. |
| 2012/0283593 A1 | 11/2012 | Searchfield et al. |
| 2013/0102937 A1 | 4/2013 | Ehrenreich et al. |
| 2013/0163797 A1 | 6/2013 | Suzman et al. |
| 2013/0218456 A1 | 8/2013 | Zelek et al. |
| 2013/0265286 A1 | 10/2013 | Da Costa et al. |
| 2014/0064516 A1 | 3/2014 | Cruz-Hernandez et al. |
| 2014/0176415 A1 | 6/2014 | Buuck et al. |
| 2014/0270190 A1* | 9/2014 | Flynn .................. H04R 25/552 |
| | | 381/23.1 |
| 2014/0350441 A1 | 11/2014 | Shafieloo |
| 2014/0363138 A1 | 12/2014 | Coviello et al. |
| 2015/0003635 A1 | 1/2015 | Baker et al. |
| 2015/0025895 A1 | 1/2015 | Schildbach |
| 2015/0038887 A1 | 2/2015 | Piccirillo |
| 2015/0070150 A1 | 3/2015 | Levesque et al. |
| 2015/0120289 A1 | 4/2015 | Lev-Tov et al. |
| 2015/0126802 A1 | 5/2015 | Lim et al. |
| 2015/0161994 A1 | 6/2015 | Tang et al. |
| 2015/0161995 A1 | 6/2015 | Sainath et al. |
| 2015/0227204 A1 | 8/2015 | Gipson et al. |
| 2015/0230524 A1 | 8/2015 | Stevens et al. |
| 2015/0241975 A1 | 8/2015 | Bhatia et al. |
| 2015/0272815 A1 | 10/2015 | Kitchens |
| 2015/0294597 A1 | 10/2015 | Rizzo |
| 2015/0305974 A1 | 10/2015 | Ehrenreich et al. |
| 2015/0351999 A1 | 12/2015 | Brouse |
| 2015/0356889 A1 | 12/2015 | Schwartz |
| 2016/0012688 A1 | 1/2016 | Eagleman et al. |
| 2016/0026253 A1 | 1/2016 | Bradski et al. |
| 2016/0027338 A1 | 1/2016 | Ebeling et al. |
| 2016/0049915 A1 | 2/2016 | Wang et al. |
| 2016/0098844 A1 | 4/2016 | Shaji et al. |
| 2016/0098987 A1 | 4/2016 | Stolcke et al. |
| 2016/0103590 A1 | 4/2016 | Vu et al. |
| 2016/0187987 A1 | 6/2016 | Ullrich et al. |
| 2016/0254454 A1 | 9/2016 | Cheng et al. |
| 2016/0255944 A1 | 9/2016 | Baranski et al. |
| 2016/0284189 A1 | 9/2016 | Constien |
| 2016/0292856 A1 | 10/2016 | Niemeijer et al. |
| 2016/0297611 A1 | 10/2016 | Williams et al. |
| 2016/0358429 A1 | 12/2016 | Ullrich et al. |
| 2016/0367190 A1 | 12/2016 | Vaitaitis |
| 2017/0169673 A1 | 6/2017 | Billington et al. |
| 2017/0206889 A1 | 7/2017 | Lev-Tov et al. |
| 2017/0213568 A1 | 7/2017 | Foshee |
| 2017/0290736 A1 | 10/2017 | Idris |
| 2017/0294086 A1 | 10/2017 | Kerdemelidis |
| 2017/0348184 A1 | 12/2017 | Pisharodi et al. |
| 2018/0033263 A1* | 2/2018 | Novich .................. G08B 6/00 |
| 2018/0210552 A1 | 7/2018 | Saboune et al. |
| 2018/0284894 A1 | 10/2018 | Raut et al. |
| 2018/0303702 A1 | 10/2018 | Novich et al. |
| 2018/0315343 A1* | 11/2018 | Shvartzberg .............. A61F 9/08 |
| 2018/0374264 A1 | 12/2018 | Gatson et al. |
| 2019/0045296 A1 | 2/2019 | Ralph |
| 2019/0201657 A1 | 7/2019 | Popelka et al. |
| 2019/0337451 A1 | 11/2019 | Bacchus et al. |
| 2019/0379977 A1 | 12/2019 | Buttner et al. |
| 2020/0121544 A1 | 4/2020 | George et al. |
| 2020/0209975 A1 | 7/2020 | Eagleman et al. |
| 2021/0089130 A1 | 3/2021 | Novich et al. |
| 2021/0110841 A1 | 4/2021 | Weber et al. |
| 2021/0169735 A1 | 6/2021 | Northen et al. |
| 2021/0325969 A1* | 10/2021 | Eagleman ................. G06F 3/16 |
| 2022/0023137 A1 | 1/2022 | Rha |
| 2022/0078566 A1 | 3/2022 | Haefeli |

FOREIGN PATENT DOCUMENTS

| | | |
|---|---|---|
| EP | 0911002 A2 | 4/1999 |
| WO | 2008106698 A1 | 9/2008 |

(56) References Cited

FOREIGN PATENT DOCUMENTS

| WO | 2012069429 A1 | 5/2012 |
|---|---|---|
| WO | 2015028480 A1 | 3/2015 |

OTHER PUBLICATIONS

European Search Report for EP Application No. 17849459 dated Mar. 4, 2020.

Extended European Search Report for EP Application No. 14181812.0 dated Nov. 11, 2014.

International Search Report and Written Opinion for PCT Application No. PCT/US17/58597 dated Jan. 4, 2018.

International Search Report and Written Opinion for PCT Application No. PCT/US2017/050288 dated Nov. 8, 2017.

"Neosensory Buzz", Neosensory Aug. 17, 2020 (Aug. 17, 2020).

"The Wristband That Gives You Superpowers", NEO.LIFE, Jan. 10, 2019 (Jan. 10, 2019) 1-16.

Horvath, Samantha, et al., "FingerSight: Fingertip Haptic Sensing of the Visual Environment", Mar. 6, 2014, IEEE, vol. 2, 2014 (Year: 2014).

Jones, Lynette A., et al., "Development of a Tactile Vest", 2004, IEEE, 0-7695-2112-6/04 (Year: 2004).

Nakamura, Mealani, et al., "An Actuator for the Tactile Vest—a Torso-Based Haptic Device", 2003, IEEE, 0-7695-1890-7/03 (Year: 2003).

Paneels, Sabrina, et al., "What's Around Me? Multi-Actuator Haptic Feedback on the Wrist", Apr. 14-18, 2013, IEEE, 978-1-4799-0088-6/13, pp. 407-412 (Year: 2013).

Plant, Geoff, "Training in the use of the Tactaid VII: A case study", KTH Computer Science and Communication (STL-QPSR), 1994, vol. 35, No. 1, pp. 091-102., Jul. 24, 2017 00:00:00.0.

Tapson, Jonathan, et al., "The Feeling of Color: A Haptic Feedback Device for the Visually Disabled", 2008, IEEE, 978-1-4244-2879-3/08, pp. 381-384 (Year: 2008).

\* cited by examiner

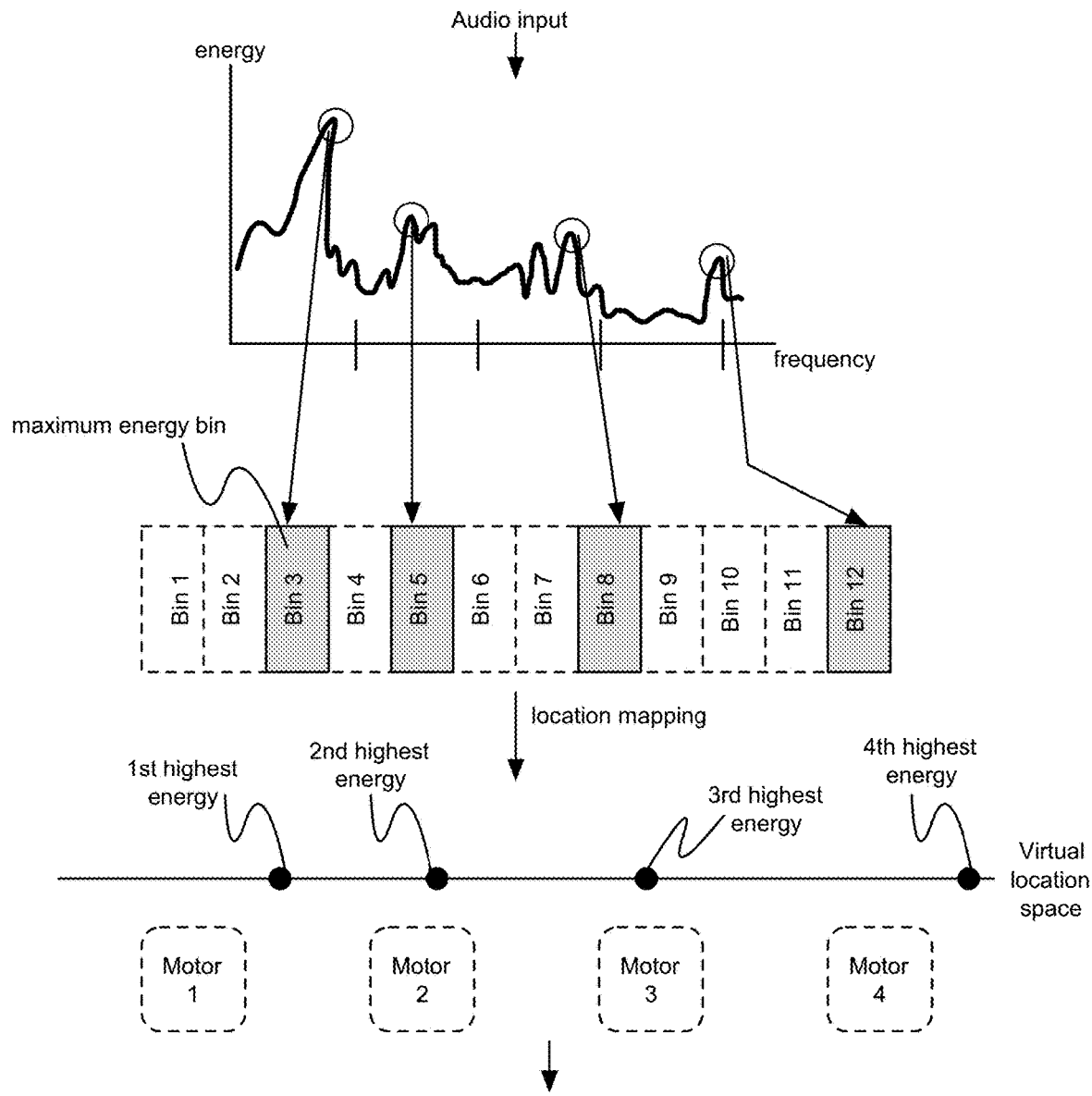

Example 1 (1st operation mode): actuate motors 1 and 2 with weighted intensities to produce an illusion stimulation, wherein the overall intensity (which is used to determine the weighted intensities) is determined based on / modulated by the energy of the maximum energy bin Example 2 (2nd operation mode): actuate motors 1 and 2 (corresponding to 1st and 2nd highest energies) simultaneously, wherein the 1st highest energy falls in a first band assigned to the 1st motor, and the 2nd highest energy falls into a 2nd band assigned to the 2nd motor Example 3 (3rd operation mode): after determining that the frequency of bin 3 corresponds to tonal sounds, actuate motors 1 and 2 with weighted intensities to produce an illusion stimulation

FIGURE 3

METHOD AND SYSTEM FOR HAPTIC STIMULATION

CROSS-REFERENCE TO RELATED APPLICATIONS

This application is a continuation of U.S. patent application Ser. No. 17/144,076, filed 7 Jan. 2021, which claims the benefit of U.S. Provisional Application Ser. No. 62/958,169, filed 7 Jan. 2020; U.S. Provisional Application Ser. No. 63/043,675, filed 24 Jun. 2020; and U.S. Provisional Application Ser. No. 63/104,944, filed 23 Oct. 2020; each of which is incorporated in its entirety by this reference.

TECHNICAL FIELD

This invention relates generally to the sensory output and signals processing fields, and more specifically to a new and useful system and method for determining and applying haptic stimuli in the sensory output and signals processing fields.

BACKGROUND

Haptic stimulation (equivalently referred to herein as tactile stimulation) of a user based on audio input(s) has been shown to have several advantages in various use cases. For individuals having hearing loss (e.g., partial hearing loss, full hearing loss, etc.), haptic stimulation can provide important information which the user might otherwise miss or have difficulty interpreting. For hearing abled individuals, haptic stimulation can provide more immersive experiences (e.g., at concerts, in gaming, etc.).

Processing the audio in an efficient way to produce intelligible haptic stimuli is challenging, however, and conventional systems and methods fail to provide stimulation which is easy to sense and be interpreted by the user in different environments.

Thus, there is a need in the sensory output field to create an improved system and method for conveying audio information to a user through haptic stimulation.

BRIEF DESCRIPTION OF THE FIGURES

FIG. 3 depicts a variation of a set of processes for mapping an audio input to a set of actuators.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
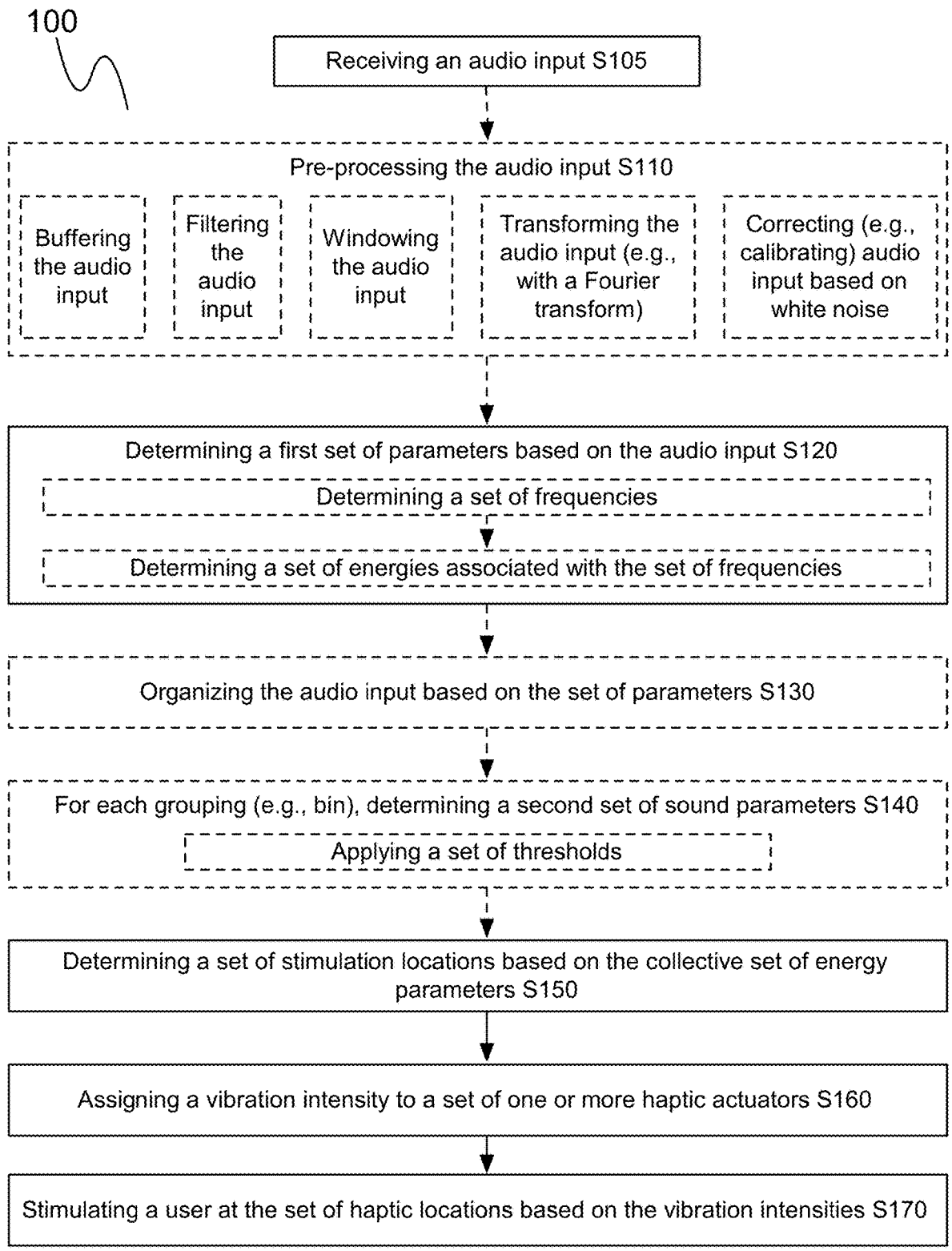
FIG. 1 is a schematic of a method for haptic stimulation.

As shown in FIG. 1, the method 100 includes receiving an audio input S105; determining a set of parameters based on the audio input S120; determining a set of stimulation locations based on a collective set of energy parameters S150; assigning a vibration intensity to a set of one or more haptic actuators S160; and stimulating a user at the set of haptic locations based on the vibration intensities S170. Additionally or alternatively, the method 100 can include any or all of: pre-processing the audio input S110; organizing the audio input into a set of bins based on the set of parameters S130; determining a set of sound parameters associated with the set of bins S140; and/or any other suitable processes.

Further additionally or alternatively, the method 100 can include any or all of the methods, processes, embodiments, and/or examples described in U.S. application Ser. No. 14/750,626, filed 25 Jun. 2015; U.S. application Ser. No. 15/661,934; filed 27 Jul. 2017; U.S. application Ser. No. 15/696,997, filed 6 Sep. 2017; and U.S. application Ser. No. 17/033,433, filed 25 Sep. 2020; each of which is incorporated in its entirety by this reference, or any other suitable processes performed in any suitable order.

Figure 2:
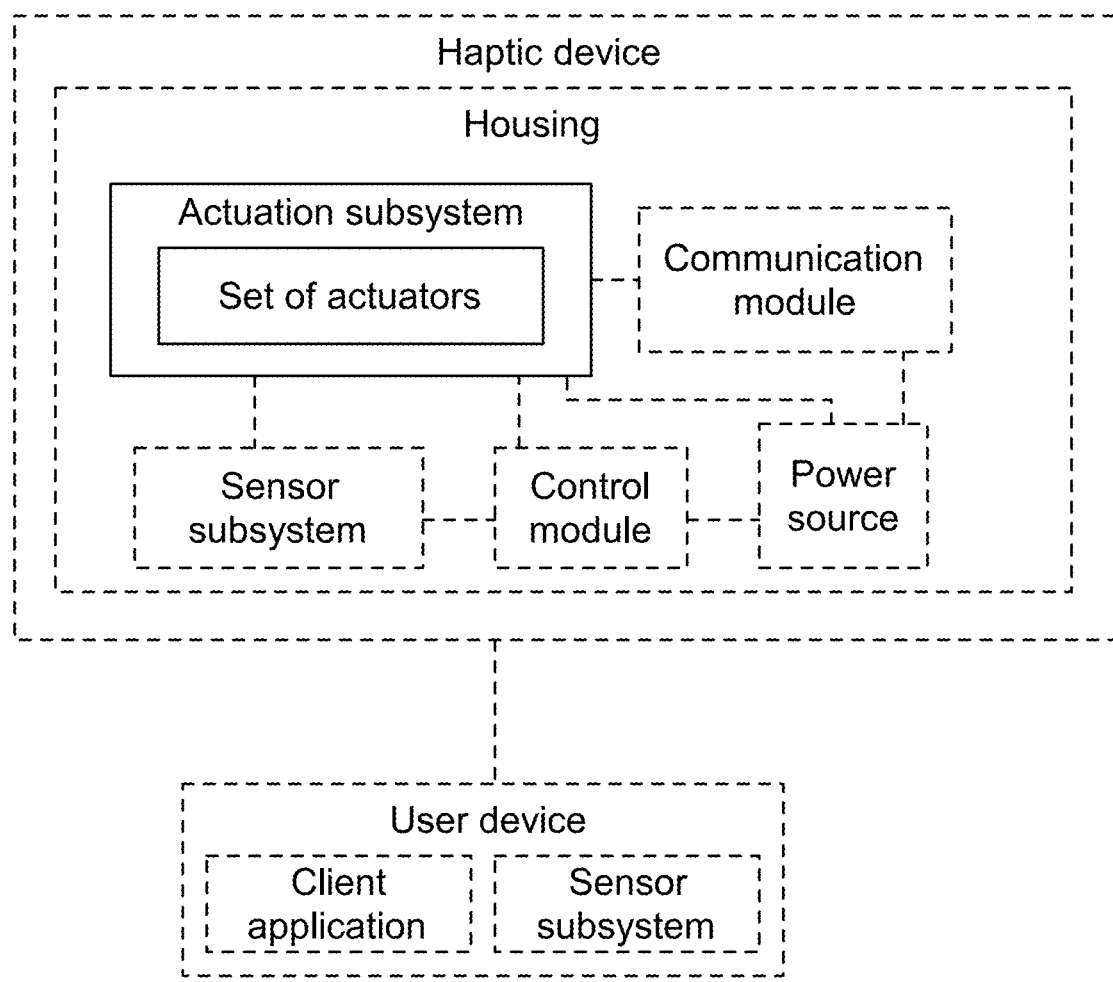
FIG. 2 is a schematic of a system for haptic stimulation.
Figure 4:
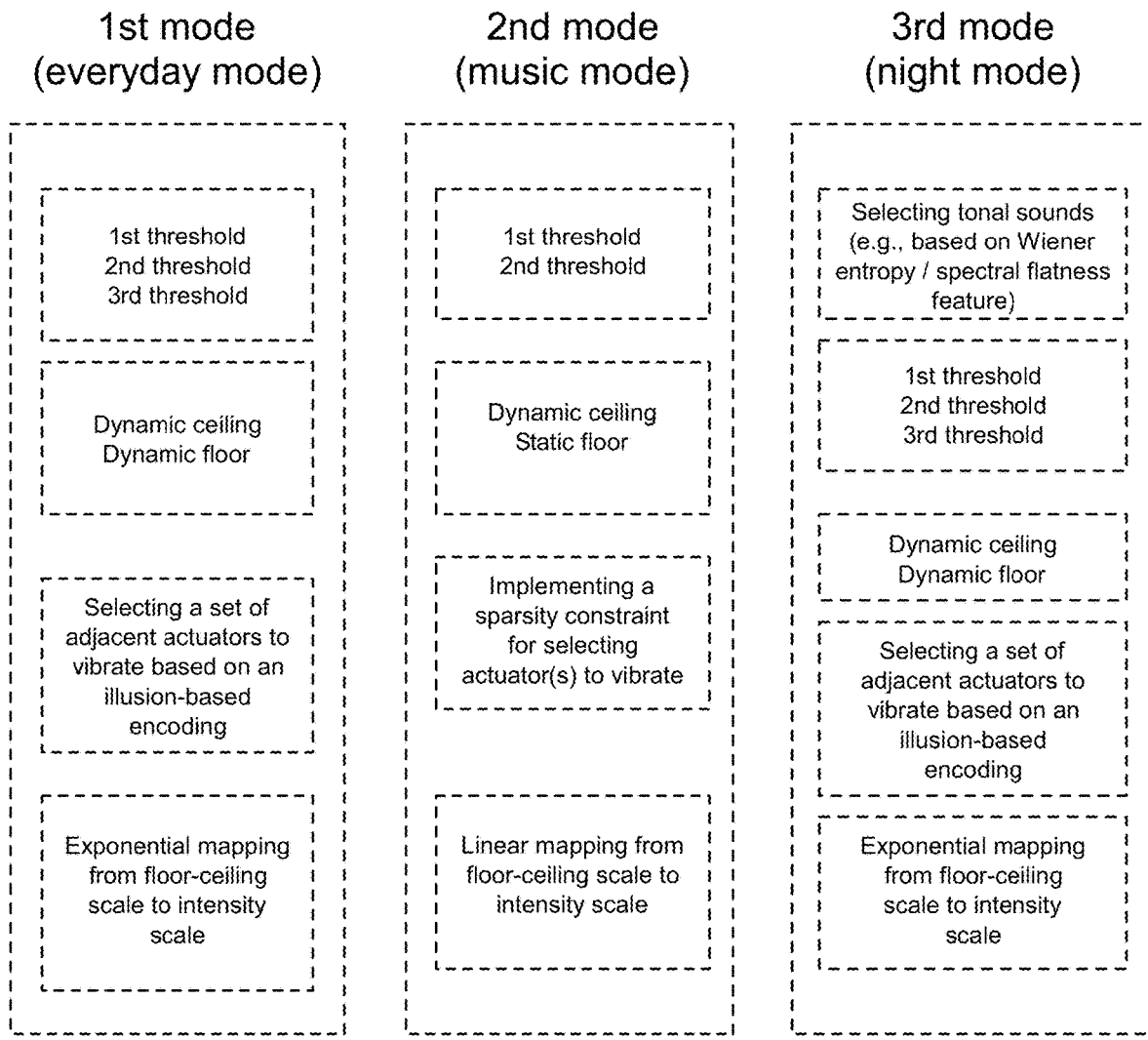
FIG. 4 depicts a variation of a set of characteristics associated with a set of operation modes.
Figure 5A:
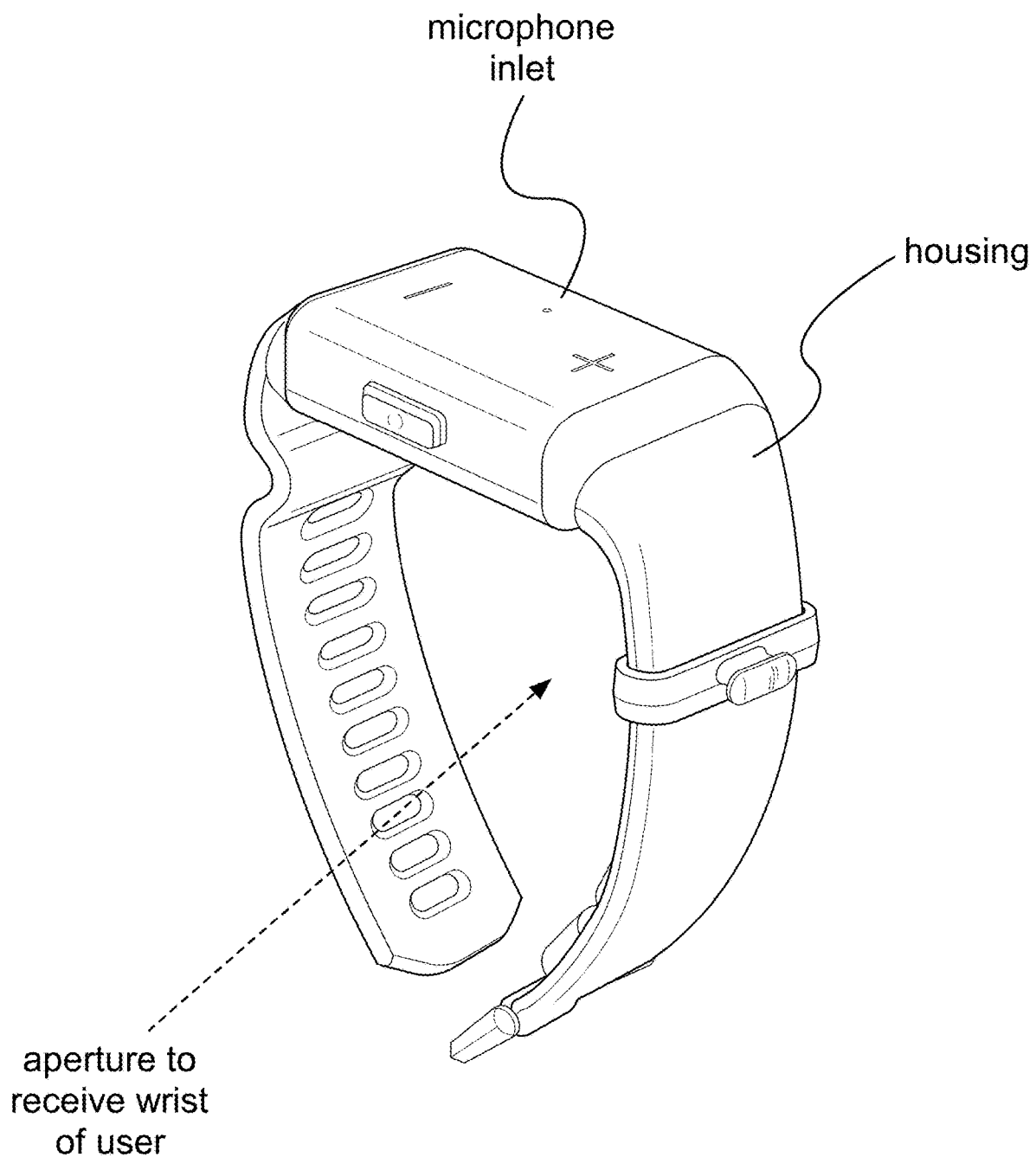
FIGS. 5A-5C depict a specific embodiment of a wristband system for haptic stimulation.
Figure 5B:
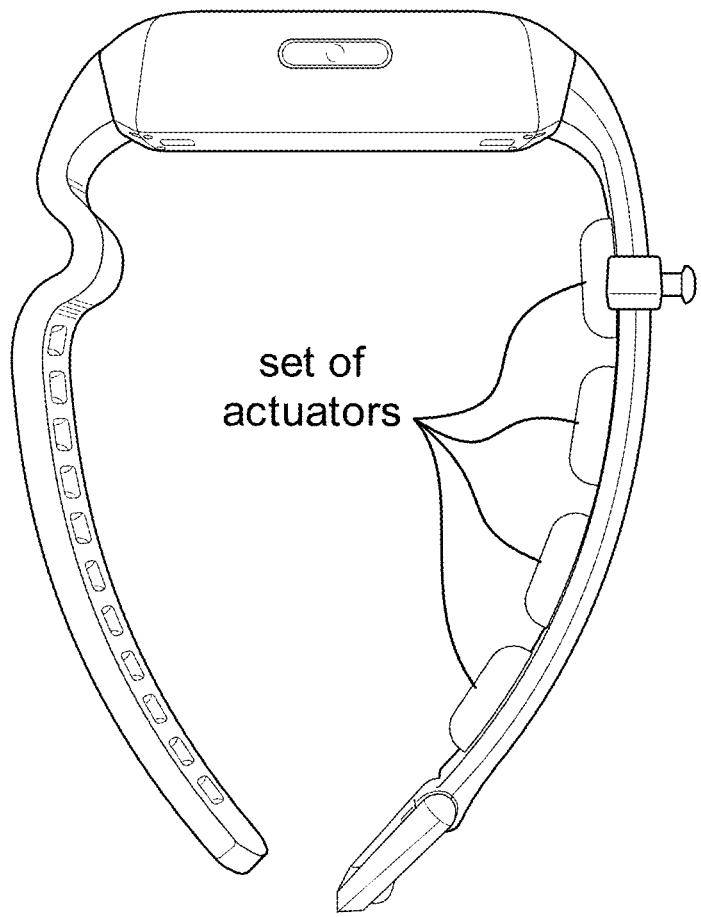
Figure 5C:
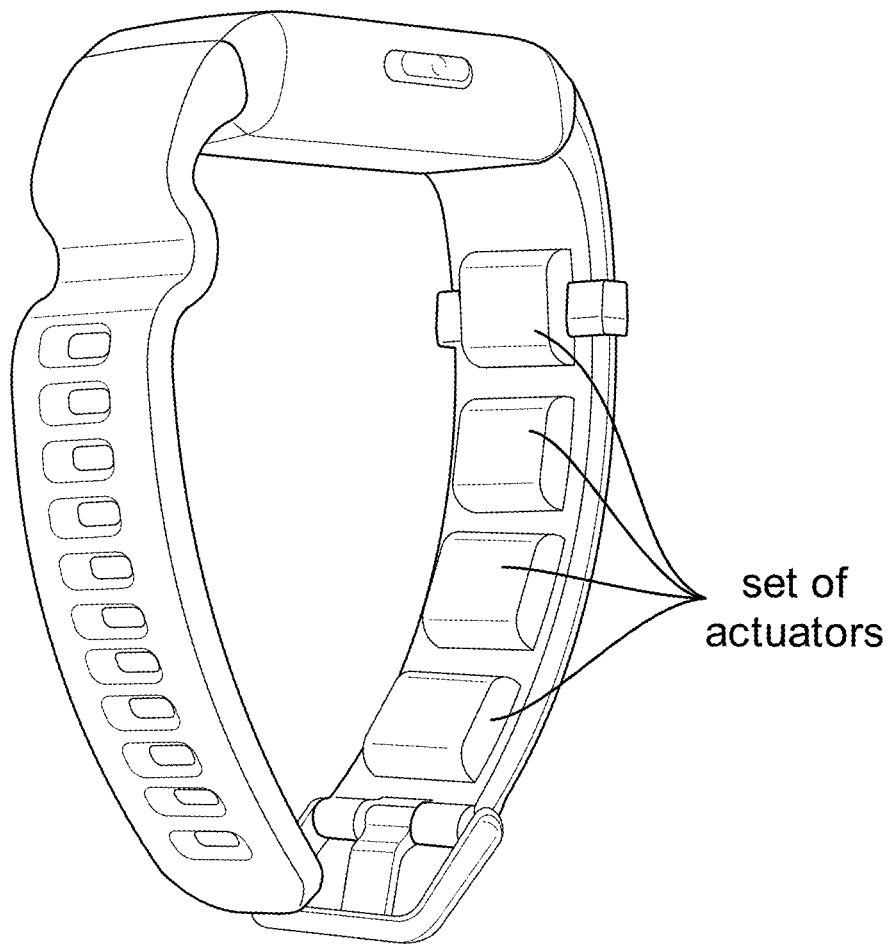

As shown in FIG. 2, a system 200 for haptic stimulation includes an actuation subsystem having a set of actuators. Additionally or alternatively, the system 100 can include or configured to interface with any or all of: a haptic device (equivalently referred to herein as a tactile device), a housing, a sensor subsystem, a control module, a user device, a client application executing on a user device, a power source, a communication module, an electrical subsystem, and/or any other suitable component(s).

Further additionally or alternatively, the system 200 can include any or all of the systems, components, embodiments, and/or examples described in U.S. application Ser. No. 14/750,626, filed 25 Jun. 2015; U.S. application Ser. No. 15/661,934; filed 27 Jul. 2017; U.S. application Ser. No. 15/696,997, filed 6 Sep. 2017; and U.S. application Ser. No. 17/033,433, filed 25 Sep. 2020; each of which is incorporated in its entirety by this reference, or any other suitable processes performed in any suitable order.

2. Benefits

The system and method for haptic stimulation can confer several benefits over current systems and methods.

In a first set of variations, the system and/or method confers the benefit of implementing a set of environment-specific algorithms that, in addition to conferring performance enhancement over conventional algorithms, can tailor the haptic stimulation to reflect any or all of: the most important sounds for the user to detect, the most enjoyable sounds for the user to detect, and the most environmentally-relevant sounds for the user to detect. In a set of specific examples, the system and method are implementable in a set of operation modes, wherein the processing of audio performed in each mode is specifically configured for the environment (e.g., actual environment, predicted environment, etc.) of the user in that mode.

In a second set of variations, additional or alternative to the first, the system and/or method confers the benefit of mapping a large range of audio features to a defined set of haptic actuators in an intelligent, easily discernible way. In a first set of specific examples, this is accomplished through illusion-based encoding. In a second set of specific examples, this is accomplished through a sparsity constraint.

In a third set of variations, additional or alternative to those described above, the system and/or method confers the benefit of reducing and/or eliminating tinnitus experienced by a user while using the system. In specific examples, for instance, it has been shown that the application of haptic stimulation to a body region of the user (e.g., wrist) can be used as an effective treatment for tinnitus.

Additionally or alternatively, the system and method can confer any other benefit.

3. System 200

The system 200 functions to apply haptic stimulation to a user based on a set of audio inputs. Additionally or alternatively, the system 200 can function process one or more audio inputs, prioritize one or more features of a set of audio inputs, and/or perform any other suitable function(s).

The system 200 preferably includes a haptic device, wherein the haptic device includes an actuation subsystem, which functions to apply haptic (e.g., vibratory) stimulation to a user based on audio data in an environment of the user. The actuation subsystem includes a set of actuators, which collectively function to convey information (e.g., audio information, visual information, etc.) through haptic stimulation to a body region of the user. The body region preferably includes a partial or full circumference of a wrist of the user, but can additionally or alternatively include any or all of: a hand, arm, finger, leg, torso, neck, head, ankle, and/or any other suitable body part or body region of the user.

The set of actuators can include one or more of: a motor (e.g., brushless motor, brushed motor, direct current (DC) motor, alternating current (AC) motor, eccentric rotating mass (ERM), etc.), an actuator (e.g., linear resonant actuator (LRA), electroactive polymer (EAP) actuator, electromechanical polymer (EMP) actuator, etc.), a piezoelectric device, and/or any other form of vibratory element. In a set of actuators including multiple actuators, the actuators can be arranged in an array (e.g., 1-dimensional array, 2-dimensional array, 3-dimensional array, etc.), arranged at least partially circumferentially around the body part (e.g., around a wrist, around half of the circumference of the wrist, etc.), arranged along the body part (e.g., up and down an arm), arranged over a body region (e.g., over the user's trunk, stomach, etc.), arranged among different body parts of a user (e.g., arranged around both wrists), and/or arranged in any other suitable way. The vibratory elements can be directly coupled to the skin of a user, separated from a user by an element of the housing (e.g., the wristband), placed over a user's clothing, and/or coupled to the user in any other way. In variations of the system configured to apply haptic stimulation to a wrist of the user, the system preferably includes 4 LRA actuators arranged around a portion of the circumference (e.g., half the circumference) of the wrist. Additionally or alternatively, the system can include actuators circumscribing the entire wrist (e.g., 8 LRA actuators), and/or any other suitable number and arrangement of actuators.

The haptic device is preferably operable in a set of modes, wherein the method 100 is performed in accordance with one or more particular operation modes. The set of operation modes can be associated with (e.g., designed for, triggered by, performed in association with, etc.) any or all of: one or more temporal parameters (e.g., time of day), one or more sensor inputs (e.g., motion and/or movement sensors, optical sensors, contact sensors, etc.); user inputs and/or user preferences (e.g., desire to detect particular types of audio such as speech vs. traffic sounds); features of detected audio (e.g., indicating that user is inside vs. outside, that user is in bed, etc.); an on/off state of the haptic device; and/or any other suitable information.

The operation modes can be any or all of: implemented independently (e.g., haptic device is operable in a single mode at each time, haptic device is operable in at most a single mode at any given time, etc.), implemented simultaneously (e.g., daytime mode and speech mode implemented together), and/or any combination. Further additionally or alternatively, the haptic device can be implemented in absence of an operation mode and/or in any other suitable operation mode(s).

In a preferred set of variations, the haptic device is operable in any or all of: an everyday mode designed for use as a default and/or daytime mode (e.g., during user's waking hours, during average waking hours, based on a user's selection of his or her particular waking hours, as detected based on a set of sensors, etc.), a night mode designed for use while the user is sleeping and/or desiring only a subset of sounds to be conveyed and/or emphasized (e.g., with greater intensity of actuation), an entertainment (e.g., music mode) which is designed to provide haptic stimulation which enhances the user's enjoyment of the entertainment experience (e.g., rather than conveying interpretable information, in addition to conveying interpretable information, etc.), and/or any other modes.

Additionally or alternatively, the set of operation modes can include one or more modes configured to process and/or convey a particular type of audio (e.g., speech, beeps and/or other potentially urgent/important sounds, music, vehicles, etc.) and/or source of audio (e.g., speech from a particular person such as a person in conversation with the user). In some variations, for instance, the set of modes includes a speech mode, which functions to convey speech (e.g., phonemes) spoken by an individual (e.g., in an environment of the user, in audio content such as a call/voice message and/or video message and/or recording [e.g., podcast]). Further additionally or alternatively, any or all of the set of operation modes can be configured to not process and/or not convey a particular type and/or source of audio (e.g., constant insignificant sounds, speech, music, etc.).

Further additionally or alternatively, any or all of the operation modes can be configured in any other suitable ways.

The information provided to the user through the set of actuators is preferably in the form of a set of stimulation patterns (e.g., series of stimulation patterns), wherein the stimulation patterns prescribe any or all of the following to the set of actuators (e.g., individually, collectively, etc.): amplitude/intensity of vibration, timing of vibration (e.g., when to start, duration, when to end, etc.), sequence of vibration, identification of which of the set of actuators to vibrate, frequency of vibration, and/or any other parameter(s) of stimulation. In preferred variations, the stimulation pattern prescribes an amplitude of vibration and a duration of vibration to one or more actuators of the set of actuators, wherein each of the set of actuators is configured to vibrate at a fixed frequency. Additionally or alternatively, the stimulation pattern can prescribe a frequency of vibration, a dynamic pattern of vibration (e.g., alternating between actuators), and/or any other suitable characteristic or parameter(s) of vibration.

The stimulation pattern(s) can optionally function to convey speech (e.g., such that the user can engage in conversation), music (e.g., composition of the music, "feel" of the music, etc.), environmental sounds (e.g., nature sounds, crosswalk indicator sounds, alarm clock, phone ring, phone notification, vehicle driving, etc.), safety sounds and/or alarms (e.g., smoke alarm, siren, vehicle horn, etc.), and/or any other suitable sounds. The user of the device can be any or all of: a user with partial or full hearing loss (e.g., using the system to assist in conversation, safely interact with the environment, etc.), a user without hearing loss (e.g., to enhance a music experience, to supplement a musical concert with a haptic experience, to enhance a gaming experience, to provide redundant information in a supplemental form, etc.), a user with partial or full vision loss (e.g., to enhance auditory information, to provide a redundant source of information, to highlight important sound sources, etc.), or any other suitable user.

The stimulation pattern(s) can correspond to (e.g., represent) one or more phonetic (e.g., speech) components (e.g., one or more frequency locations of a formant, peak frequency amplitudes, phonemes, sub-phoneme components, super-phoneme assemblies, morphemes, phones, diphones, triphones, diphthongs, triphthongs, letter, word, phrase, etc.) as well as one or more features of phonetic components (e.g., phoneme pitch, phoneme energy, phoneme tone, phoneme emphasis, etc.). Additionally or alternatively, the stimulation pattern(s) can correspond to a musical parameter (e.g., a musical note, chord, instrument, rhythm, beat, cadence, etc.), and/or any other suitable audio parameter (e.g., frequency of a siren, volume, etc.).

The actuation subsystem can include a haptic driver (e.g., LRA driver) configured to actuate the set of actuators according to the stimulation pattern. Additionally or alternatively, the actuators can be actuated in any suitable way with any other suitable component(s).

The haptic device preferably includes and/or defines a housing, which functions to support the set of actuators. The housing can additionally or alternatively function to: suspend the set of actuators, maintain a separation distance between the set of actuators, maintain an offset (e.g., minimize, maintain a constant offset, etc.) of the set of actuators from a skin surface of the user, conform to a variety of users (e.g., conform to a variety of user wrist sizes, flex to wrap around a user's wrist, etc.), house other components of the system (e.g., sensor subsystem, control module, etc.), be comfortable to a user, enhance a vibration of the actuators (e.g., minimize a dampening of the haptic output), reduce direct sound transmission from the set of actuators to a microphone, maintain an orientation of the system on a user (e.g., prevent rotation of the support subsystem on the wrist of a user), protect one or more components (e.g., electronic components), assist in alignment of the support subsystem, and/or perform any other suitable function. Additionally or alternatively, the haptic device can be absent of a housing (e.g., with actuators secured to skin using a temporary adhesive), include multiple housings, and/or be otherwise configured and/or arranged.

In preferred variations, the housing is configured to couple the actuation subsystem to a body region of the user (e.g., as described above). As such, the housing can include and/or define any or all of: garment(s) (e.g., vest, sleeve, hat, scarf, compression sleeve, etc.), fastener(s) (e.g., wristband, anklet, strap, clasp, buckle, hook-and-loop fastener, etc.), adhesives (e.g., to adhere the housing and/or the actuation subsystem to a skin surface of the user), and/or any other suitable components.

The system can include a sensor subsystem, which includes at least a set of one or more microphones, which individually and/or collectively sample audio information from an environment of the user, which can be subsequently analyzed (e.g., processed, assessed, etc.) to determine (e.g., create, select, etc.) a stimulation pattern to be applied at the set of actuators. The set of microphones can include any or all of: one or more omnidirectional microphones, one or more unidirectional microphones, one or more bidirectional microphones, and/or any other suitable microphones. The set of microphones can optionally be used in combination with one or more beamforming processes (e.g., beamforming microphones), but can additionally or alternatively be used in absence of beamforming and/or in any other suitable implementations. The sensor subsystem can additionally or alternatively include any other sensors, such as any or all of: an optical sensor (e.g., camera), location sensor (e.g., GPS system), motion sensor (e.g., accelerometer, gyroscope, etc.), and/or any other suitable sensor(s).

Sensors can include: optical sensors such as cameras (e.g., visual range, multispectral, hyperspectral, IR, stereoscopic, etc.), location sensors (e.g., Global Positioning System [GPS] sensors), orientation sensors (e.g., accelerometers, gyroscopes, altimeters), acoustic sensors (e.g., microphones), motion and/or movement sensors (e.g., speedometer, accelerometer, etc.), optical sensors (e.g., photodiodes, etc.), temperature sensors, pressure sensors, flow sensors, vibration sensors, proximity sensors, chemical sensors, electromagnetic sensors, force sensors, biological sensors (e.g., electroencephalography [EEG] sensors, heart rate sensors, etc.), contact (e.g., skin conductance) sensors, temperature sensors, humidity sensors, temporal sensors (e.g., clock) and/or any other suitable type of sensor(s).

The sensor subsystem is preferably at least partially arranged onboard the haptic device, but can additionally or alternatively be arranged remotely from (e.g., separate and distinct from) the haptic device, such as at another device or set of devices (e.g., at a user device, at an external sensor subsystem, etc.). In some variations, for instance, a first set of sensors (e.g., microphone(s)) of the sensor subsystem is arranged onboard the haptic device and a second set of sensors (e.g., camera, motion/movement sensor, etc.), such as an optional set of sensors, is arranged onboard a user device. Additionally or alternatively, the sensors can be otherwise arranged.

The sensors can optionally function to implement and/or trigger one or more operation modes (and/or a transition in operation mode) of the haptic device. This can, include for instance, detecting any or all of: an environment of the user (e.g., user is inside, user is outside, with a camera, user is with people, user is near cars, with a microphone, with a location sensor, etc.), a time of day (e.g., with a clock, with an optical sensor, etc.), that the user is awake and/or sleeping (e.g., based on motion/movement sensors, based on light level detected by an optical sensor, etc.), that the user is listening to music (e.g., at a concert based on location information, etc.), that the user is driving and/or in a vehicle (e.g., based on location information), and/or can detect any other suitable information and/or environmental characterizations of the user.

Figure 6:
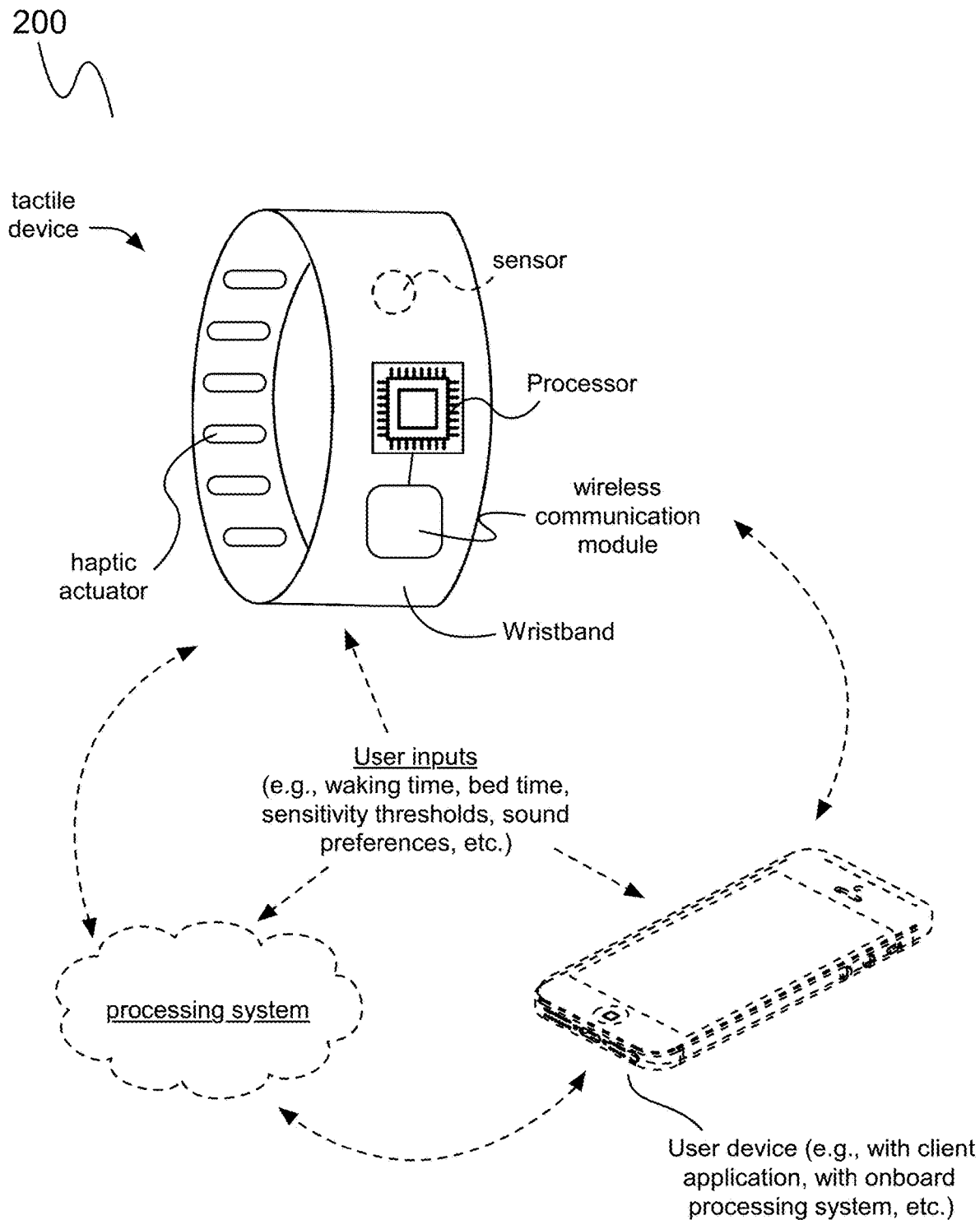
FIG. 6 depicts a schematic variation of communication between multiple processing systems.

Additionally or alternatively, information operation modes can be triggered and/or implemented based on information from one or more client applications (e.g., executing on a user device as shown in FIG. 6 in communication with the haptic device), such as, but not limited to, any or all of: navigation applications (e.g., to indicate user is driving), sleep applications, heart rate monitoring applications, alarm applications, music and/or podcast applications, video streaming applications, and/or any other suitable applications. In some variations, for instance, information from a sleep application executing on a user device (e.g., mobile phone) of the user can be used to trigger a night operation mode of the haptic device.

The system can include a control module (e.g., within the housing, remote from the housing, onboard a user device, etc.), which functions to apply a stimulation pattern through the actuation subsystem. Additionally or alternatively, the control module can function to determine one or more stimulation patterns (e.g., at a computing subsystem), store one or more stimulation patterns, monitor system performance, implement a fail-safe (e.g., power shut-off in the event of overheating or stimulation pattern parameter above a predetermined threshold, alarm, etc.), and/or perform any other suitable function. The control module preferably includes and/or interfaces with a processing system (e.g., processors, microprocessors, central processing units [CPUs], computing systems, etc.), wherein the processing system functions to process the audio inputs and determine a stimulation pattern with which to actuate one or more actuators based on the audio inputs. At least a portion of the processing system (e.g., one or more processing subsystems) is arranged onboard the haptic device. Additionally or alternatively, any or all of the processing system can be arranged remotely from the haptic device (e.g., at a user device, at a remote computing system, etc.) and/or processing can be performed at any suitable locations.

Determining a stimulation pattern can include any or all of: determining a new stimulation pattern (e.g., based on an algorithm, based on a machine learning model, etc.), selecting a stimulation pattern (e.g., from a lookup table, from a library, from a record of previously applied stimulation patterns, etc.), determining a set of parameters associated with a stimulation pattern (e.g., a set of weights for a stimulation pattern algorithm, an amplitude a stimulation, a frequency of stimulation, etc.), and/or any other suitable stimulation pattern and/or parameter(s) associated with a stimulation pattern.

The system 100 can optionally include and/or be configured to interface with a user device and/or a client application executing on the user device. The client application preferably enables a user to select one or more operational parameters of the system, such as any or all of: an operation mode (e.g., music mode, conversation mode, quiet mode, on mode, off mode, etc.), an operational parameter (e.g., sensitivity of detected audio, overall amplitude of vibration, etc.), and/or any other suitable parameter. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a WiFi module, BLE, cellular module, etc.), or any other suitable component.

Additionally or alternatively, the system can include any or all of: a power source, a communication module (e.g., a wireless communication module, Wifi chip, Bluetooth chip, etc.), and/or any other suitable components.

The system 200 is preferably operable in a set of operation modes, wherein the operation mode can determine (e.g., select) a set of processes to implement during the method 100. The operation modes can be any or all of: selected by a user (e.g., at a client application of a user device, at a web browser, at the haptic stimulation device, based on user preferences and/or user-selected presets, etc.); automatically determined, such as based on any or all of: time of day, a deep learning model and/or set of predictive algorithms, sensor information (e.g., as described above), client applications (e.g., as described above), and/or any other suitable information; determined based on a combination of these and/or otherwise determined. The processes (e.g., algorithms) implemented for the modes can be distinct, overlapping, and/or otherwise characterized.

Each of the operation modes is preferably optimized for a particular environment of the user, which can take into account any or all of: the types of sounds that the user will likely be exposed to (e.g., speech, nature sounds, music, gaming, quiet, loud, etc.); the importance of the sounds that the user will likely be exposed to (e.g., critical sounds such as emergency sounds/warning sounds, non-critical sounds, conversation sounds for hearing-impaired individuals, desired sounds, undesired sounds, etc.); an activity of the user within the environment (e.g., gaming, attending a concert, participating in a conversation, sleeping, etc.); and/or any other suitable factors.

In a first set of preferred variations, the set of operation modes includes a $1^{st}$ mode, which functions as a default mode. The $1^{st}$ mode preferably detects sounds at least occurring in a daytime period (e.g., between 8 AM and 5 PM, after sunrise and before sunset, based on user presets and/or preferences, etc.), such as sounds occurring in the various environments that the user travels to throughout the day. As such, various different types of sounds can be received in the $1^{st}$ mode, which are subsequently processed according to their respective energy levels, wherein the sounds corresponding to the highest energy level(s) at any given window of time are transformed into haptic stimulation and provided to the user. Additionally or alternatively, the $1^{st}$ mode can be otherwise triggered and/or implemented, such as based on any or all of: a user location (e.g., at home, at work, etc.), a user environment (e.g., detected based on sensor information and/or audio features), any or all of the information described above, and/or any other suitable information.

The $1^{st}$ mode (and/or any other mode) can be automatically triggered based on: a time (e.g., time of day), sensor information (e.g., optical sensor information), a machine learning model (e.g., a deep learning model, a neural network, a convolution neural network, etc.), and/or any other suitable information. Additionally or alternatively, the $1^{st}$ mode can be selected by a user (e.g., at a housing of the device, based on a spoken command from the user, selected at a client application, etc.), and/or otherwise determined.

In a first variation of the $1^{st}$ mode, the $1^{st}$ mode is referred to as an "everyday" mode, and is implemented (e.g., as selected by a user, as determined by a time of day, etc.) as a default and at least during a daytime period of the user's day and/or at any other time(s) a user prefers a default mode.

Additionally or alternatively, the set of operation modes can include a $2^{nd}$ mode, which functions to process and convey sounds to the user for the user's enjoyment and/or entertainment, such as while the user is listening to music (e.g., at home, at a concert, etc.). The $2^{nd}$ mode can optionally prioritize enjoyment over conveying interpretable information, but can optionally include and/or prioritize conveying interpretably information and/or performing any other function. In some variations, the $2^{nd}$ mode is configured to bring out as much detail in the music as possible (e.g., through a bins-to-bands process and/or through the selection of floor and ceiling values) across a desired frequency range (e.g., corresponding to music).

The $2^{nd}$ mode can be automatically triggered based on: a time (e.g., time associated with a concert of the user), features of the audio input (e.g., corresponding to music), a deep learning model, one or more sensor inputs, and/or any other suitable information. Additionally or alternatively, the $2^{nd}$ mode can be selected by a user (e.g., at a housing of the device, based on a spoken command from the user, selected at a client application, etc.), and/or otherwise determined.

In a first variation of the $2^{nd}$ mode, the $2^{nd}$ mode is referred to as a music mode, and is implemented (e.g., as selected by a user, as determined based on the features of an audio input, etc.) while the user is listening to music and/or any other audio for entertainment purposes.

Further additionally or alternatively, the set of modes can include a $3^{rd}$ mode, which functions to convey critical (e.g., emergency, urgent, etc.) information to the user. The $3^{rd}$ mode preferably detects sounds at least occurring in the nighttime and/or when the user is sleeping, such as sounds that would be important for a user to be made of aware of (e.g., and awoken based on). As such, the sounds converted into haptic stimulation during the $3^{rd}$ mode preferably include sounds related to emergencies (e.g., smoke alarm, intruder, knocking on door, etc.) and/or alarms, which can optionally be characterized as particularly tonal sounds. Additionally or alternatively, the $3^{rd}$ mode can receive and process any other suitable sounds.

The $3^{rd}$ mode can be automatically triggered based on: a time (e.g., time of day), sensor information (e.g., optical sensor information), a deep learning model, and/or any other suitable information. Additionally or alternatively, the $3^{rd}$ mode can be selected by a user (e.g., at a housing of the device, based on a spoken command from the user, selected at a client application, etc.), and/or otherwise determined.

In a first variation of the $3^{rd}$ mode, the $3^{rd}$ mode is referred to as a "night" mode, and is implemented (e.g., as selected by a user, as determined by a time of day, etc.) proximal in time to when the user is sleeping.

Additionally or alternatively, the set of operation modes can include any other suitable modes (e.g., as described above).

In a first variation, the system 200 includes a set of haptic actuators, a microphone, and a housing configured to arrange the set of haptic actuators around a body region (e.g., wrist region) of the user and is configured to be operable in a set of operation modes, wherein the set of operation modes includes: a $1^{st}$ mode configured to be implemented as a default daytime mode; a $2^{nd}$ mode configured to be implemented while the user is listening to music or while in other entertainment environments; and a $3^{rd}$ mode configured to be implemented while the user is sleeping.

In specific examples, the system includes any or all of the systems, components, embodiments, and/or examples described in U.S. application Ser. No. 17/033,433, filed 25 Sep. 2020, which is incorporated herein in its entirety by this reference.

4. Method 100

The method 100 functions to apply haptic stimulation to a body region of a user based on a set of audio inputs and optionally an operation mode in which the associated system is operating. Additionally or alternatively, the method 100 can function to convey audio information to a user; enhance a user's enjoyment of an experience (e.g., concert, gaming, etc.); and/or perform any other suitable function(s).

The method 100 is preferably performed in accordance with a set of operation modes, such as any or all of those described above. The method 100 is further preferably performed with a system 200 as described above, but can additionally or alternatively be performed with any other suitable system(s).

In preferred variations, the method 100 is performed at least in part with a processing system of the system (e.g., as described above), but can additionally or alternatively be performed with any other suitable components.

4.1 Method: Receiving an Audio Input S105

The method 100 includes receiving an audio input S105, which functions to receive an input with which to perform any or all of the subsequent processes of the method, thereby determining a haptic stimulation based on the audio input to provide to a user.

S105 is preferably performed multiple times during operation of the haptic device, such as any or all of: continuously, at a predetermined frequency (e.g., every second, between every millisecond and every 10 milliseconds, between every 10 milliseconds and every 100 milliseconds, between every 100 milliseconds and 1 second, between every second and 5 seconds, between every 5 and 10 seconds, etc.), at a set of random intervals, and/or at any other suitable time(s). Additionally or alternatively, S105 can be performed in response to one or more triggers, once, any number of times, and/or at any other suitable times during the method 100.

The audio input is preferably in the form of an audio signal, further preferably an audio waveform, wherein the audio waveform can be processed in accordance with any or all of the subsequent processes of the method. Additionally or alternatively, any other suitable audio input(s) can be received.

The audio input is preferably received at a microphone of a sensor subsystem of the system, such as a microphone onboard a housing of a wearable system, but can additionally or alternatively be received from a microphone of a separate sensor subsystem (e.g., onboard a user device), a remote computing system, and/or any other suitable sensor or information source.

In a variation, S105 includes receiving an audio input at a predetermined sampling frequency at one or more microphones of the haptic device.

4.2 Method: Pre-Processing the Audio Input S110

The method 100 can optionally include pre-processing the audio input S110, which functions to prepare the audio input for any or all of the processes described below.

S110 is preferably performed in response to S105 and prior to S120, but can additionally or alternatively be performed at any other time(s) during the method 200. S10 is preferably performed at least once during the method 100 (e.g., each time S105 is performed), but can additionally or alternatively be performed any or all of: once, multiple times (e.g., continuously, at a predetermined frequency, at a predetermined set of intervals, at random intervals, etc.), in response to a trigger, and/or at any other suitable times.

The processes involved in S110 can be performed in any suitable order, and/or any or all of the processes can be performed a single time, multiple times, and/or any other suitable number of times.

S110 can optionally include filtering the audio input, which can function to remove noise (e.g., motor noise), unimportant audio features, audio artifacts (e.g., audio artifacts caused by reflections, audio features resulting from multiple microphones picking up the same signal at different positions, etc.), and/or any other features of the audio input. In preferred variations, the audio input is filtered to eliminate motor noise (e.g., resonant frequencies of the set of haptic actuators) and its harmonics from the audio input. In a specific example, the filtering is performed with a comb filter; additionally or alternatively, any other suitable filter(s) can be used, such as, but not limited to, any or all of: low-pass filters, high-pass filters, cutoff frequency filters, bandpass filters, center frequency filters, passband filters, bandwidth filters, quality factor (Q) filters, resonance filters, equalization (EQ) filters, and/or any other suitable filters.

Additionally or alternatively, the method 200 can be performed in absence of this filtering and/or any other filtering.

S110 can include performing a windowing of the audio data, which functions to separate the audio signal into a set of discrete samples, which can then be individually processed and encoded into a haptic stimulus at one or more of the set of actuators. In variations of the method including a Fourier transform process or other transform process of the audio data, the windowing preferably functions to mitigate and/or minimize the artifacts that can occur as a result of not integrating the transform over infinite time, such as through producing overlapping windows. Alternatively, the windows can be non-overlapping. The resulting windows can include any suitable windows, such as, but not limited to Hann windows. Additionally or alternatively, S110 can be performed with any other suitable processing, performed in absence of windowing, and/or can be otherwise performed.

S110 preferably includes performing a transform process of (transforming) the audio input, further preferably a Fourier transform process (e.g., fast Fourier transform [FFT]), which functions to determine a set of frequencies associated with the audio input. Additionally or alternatively, the transform process can include any or all of: a discrete cosine transform; a neural network; and/or any other suitable processes. Further additionally or alternatively, the audio input can be received in S105 in any domain (e.g., frequency), the audio input can transformed into any other domain (e.g., time), S110 can include multiple transforms, S110 can be performed in absence of a transform, and/or the audio can be otherwise processed.

S110 preferably includes correcting (e.g., calibrating, filtering, etc.) the audio input based on white noise, such as with the results a white noise spectral calibration process, which functions to prevent audio corresponding to white noise from being processed and/or conveyed to the user through haptic stimulation. Additionally or alternatively, the spectral calibration process can function to flatten the device's frequency response for features corresponding to the device's own acoustical properties. In some variations, the white noise spectral calibration process includes any or all of: introducing (e.g., flooding in) white noise (e.g., a uniform distribution audio signal with all frequencies represented, actual white noise, simulated white noise, etc.) to the system; determining a spectrogram associated with the white noise; and calibrating the system such that the spectrogram is registered as being flat. Incoming audio being pre-processed in S110 can then be corrected based on the spectrogram determined in the spectral calibration process. This correction process can be performed once (e.g., during manufacture of the system, prior to the system being used by the user, during an onboarding process, etc.); multiple times (e.g., routinely, at a predetermined frequency, randomly, upon detecting that a recalibration is needed, etc.); continuously, and/or at any other suitable time(s). The correction process can be performed for all frequencies together, each frequency band individually as determined by a Fourier transform process, and/or for any other frequencies.

In a first variation, the spectral calibration process is the same across all devices of the same type (e.g., designed for the particular device model). In a second variation, the spectral calibration process is performed for each device.

The spectral calibration process can optionally additionally or alternatively be performed for each user, which can function, for instance, to calibrate the haptic device to the environment of the user. Additionally or alternatively, the spectral calibration process can be any or all of: performed for each operation mode, performed multiple times (e.g., routinely to recalibrate), performed in response to a trigger, and/or otherwise performed. Further additionally or alternatively, the same calibration process can be performed for all haptic devices and/or S110 can be performed with any other suitable calibration process(es).

Additionally or alternatively, S110 can include any other suitable pre-processing, such as buffering and/or any other suitable processes.

In a first variation, S110 includes any or all of: filtering the audio input (e.g., to remove noise), windowing the audio input, transforming the audio input, removing white noise from the audio (e.g., with a spectral correction), and/or any other suitable processes performed in any suitable order. In a set of specific examples, S110 includes filtering the audio input with a comb filter, windowing the audio input into a set of windows with a Hann windowing process, transforming the audio input into the frequency domain with an FFT, and correcting the audio input to remove white noise.

4.3 Method: Determining a Set of Parameters Based on the Audio Input S120

The method 100 includes determining a set of parameters based on the audio input S120, which functions to quantify the contents of the audio input in order to determine a set of haptic stimuli to provide to the user.

S120 is preferably performed in response to S110 (e.g., with a pre-processed audio input), but can additionally or alternatively be performed at any or all of: in response to S105 (e.g., in absence of S10), as part of S110, multiple times throughout the method 100 (e.g., continuously, at a predetermined frequency, etc.), in response to a trigger, and/or at any suitable time(s). Further additionally or alternatively, the method 100 can be performed in absence of S120.

S120 preferably includes at least determining a set of frequencies of the audio input and a set of energies (e.g., amplitudes) associated with the set of frequencies. The frequencies and energies (e.g., amplitudes), which can optionally be represented as (e.g., stored as) a set of (frequency, energy) pairs, are preferably determined at least based in part based on a transform process of S110 as described above, but can additionally or alternatively be otherwise determined. Further additionally or alternatively, any other suitable parameters (e.g., temporal parameters, power, etc.) can be determined.

S120 can optionally additionally or alternatively include determining a set of aggregated parameters (e.g., average frequency, median frequency, minimum frequency, maximum frequency, average energy, median energy, minimum energy, maximum energy, etc.), such as any or all of those described below.

In a first set of variations, S120 includes determining a set of frequencies present in the audio input (e.g., with a transform as performed in S110) and a set of energies associated with the set of frequencies (e.g., with the same transform).

4.4 Method: Organizing the Audio Input Based on the Set of Parameters S130

The method 100 can optionally include organizing the audio input based on the set of parameters S130, which functions to enable a comparison between and/or a prioritization of the determined set of audio parameters (equivalently referred to herein as audio features or features). Additionally or alternatively, S130 can function to provide information associated with location(s) at which haptic stimulation should be applied during subsequent process(es) of the method, eliminate any or all of the audio input (e.g., particular frequency/energy pairs) from further processing, update one or more parameters associated with the haptic device (e.g., a floor and/or ceiling as described below), and/or can perform any other suitable functions.

S130 is preferably performed in response to S120, wherein the audio input is organized based on any or all of the parameters determined in S120. Additionally or alternatively, S130 can be performed at any or all of: in response to S10 (e.g., in absence of S120), as part of S120, multiple times during the method 100 (e.g., continuously, at a predetermined frequency, iteratively, etc.), and/or at any other suitable times during the method. Further additionally or alternatively, the method 100 can be performed in absence of S130.

S130 preferably includes organizing the audio input into a set of groupings, equivalently referred to herein as bins, based on a set of parameters associated with the audio input (e.g., those determined in S120). Additionally or alternatively, S130 can include any other suitable organizational processes.

The set of bins are preferably associated with a set of frequencies, wherein the bins (equivalently referred to herein as frequency bins) organize the audio input according to frequency. Additionally or alternatively, the bins can organize the audio input based on any other suitable parameter(s) (e.g., time, energy, etc.). The set of bins are further preferably predetermined, but can additionally or alternatively be dynamically determined and/or otherwise determined.

In preferred variations, the audio data is organized into frequency bins based on the frequencies determined in S120, wherein each bin represents a range of frequencies. The set of bins are preferably equal in size (e.g., same range of frequencies in each bin), equivalently referred to herein as width, but can alternatively have different sized frequency ranges (e.g., based on a logarithmic or other non-linear bin size). The bins can be overlapping, non-overlapping, or otherwise arranged. In a set of specific examples, each frequency bin effectively contains a set of complex values representing an (energy, phase) pair of a sine wave corresponding to a frequency of the bin, wherein a magnitude of the (energy, phase) pair can be taken (e.g., in S130, in S120, etc.) to determine an energy.

The bins can optionally be further organized into a set of bands, wherein each band preferably includes multiple bins but can alternatively include a single bin. In some variations, for instance, the number of bands is equal to the number of actuators of the haptic device, wherein each of the bands includes a range of frequencies and includes all bins within that range of frequencies (e.g., as referenced in Example 3 of FIG. 2). Additionally or alternatively, the bands can be otherwise defined, the bins can be otherwise organized, and/or S130 can be performed in absence of S130.

In a first set of variations, the audio data (e.g., pre-processed audio data) is organized into a set of equal-width frequency bins based on the frequency parameters determined in S120.

In a specific example, the audio data is organized into a set of 128 equal-width frequency bins covering a range between 0 and 8 kHz.

In a second set of variations, the audio data (e.g., pre-processed audio data) is organized into a predetermined set of variable sized bins.

In a third set of variations, the frequencies assigned to each bin and/or the bin sizes are dynamically determined based on the received audio input (e.g., based on a minimum and maximum frequency value of the audio input).

4.5 Method: Determining a Set of Parameters Associated with the Set of Bins S140

The method 100 can optionally include, for each bin, determining a set of sound parameters S140 associated with the set of bins, which functions to prioritize which features of the audio input to convey (e.g., directly, indirectly, etc.) to the user through haptic stimulation.

S140 is preferably performed in response to S130 but can additionally or alternatively be performed at any or all of: as part of S130, multiple times during the method 100 (e.g., continuously, at a predetermined frequency, etc.)

The set of sound parameters (equivalently referred to herein as a second set of parameters) preferably include a set of energy parameters, which can be chosen from the set of energy parameters previously determined. Additionally or alternatively, any or all of the set of energy parameters can be calculated or otherwise determined based on one or more of the energy parameters described above, such as through a set of algorithms, a mapping, a model (e.g., deep learning model), referenced from a lookup table, and/or otherwise determined (e.g., based on other parameters).

The set of energy parameters preferably includes a maximum energy associated with one or more frequencies (e.g., single frequency, frequency associated with a bin, mean bin frequency, etc.). The maximum energy can be an overall maximum energy, the maximum energy associated with a bin, the maximum energy associated with a set of multiple bins (e.g., a band of bins, the set of bins corresponding to a haptic actuator, etc.), and/or any other suitable maximum. Additionally or alternatively, the set of energy parameters can include any or all of: a minimum energy, a mean energy (e.g., a mean energy of a bin), a median energy, a variance of energy (e.g., variance of energy of a bin), a historical energy (e.g., previous bin energy), and/or any other suitable parameters. Further additionally or alternatively, any or all of the parameters determined in S140 can be parameters other than energy parameters.

The sound parameters can additionally or alternatively include one or more parameters associated with a characteristic of and/or type of sound, such as a tonality of the sound(s) (tonal sound). In variations of the method implemented during one or more operation modes (e.g., a $3^{rd}$ operation mode such as night mode), for instance, sound parameters corresponding to highly tonal sounds—sounds concentrated in a particularly narrow part of the audio spectrum and/or having a high proportion of energy at a single frequency and/or small range of frequencies—are prioritized for stimulation, as these can indicate important sounds for a user to be made aware of while sleeping, such as any or all of: alarms (e.g., alarm clock, smoke alarm, security alarm, etc.), alerts, notifications (e.g., ringtone), machinery (e.g., motors), and/or other sounds. In specific examples, for instance, tonal sounds from a cellphone ring can be distinguished from and optionally prioritized over non-tonal sounds such as sheets rubbing and/or persons breathing, even though the non-tonal sounds may exceed an energy/loudness threshold (e.g., as described below), for instance.

Tonal sounds are preferably identified through the determination of an entropy, such as—but not limited to—a Wiener entropy (e.g., determined from a Wiener process) and/or other spectral flatness feature, wherein the smaller the value of the entropy, the more tonal (e.g., peaky) the sound is. In some variations, for instance, prior to selecting a bin with the largest energy for stimulation, the associated Wiener entropy is calculated and compared with a threshold. In an event that the entropy value is less than the threshold (e.g., 0.1, less than 0.1, greater than 0.1, etc.), the bin can be passed through to subsequent processing.

S140 can optionally include tracking one or more energy parameters, such as any or all of those described above, and/or any other suitable parameters, which can function to set a floor and/or a ceiling described below. In some variations (e.g., during a $1^{st}$ operation mode, during a $3^{rd}$ operation mode, etc.), for instance, a mean energy parameter (e.g., mean energy of each bin, mean energy of the largest energy bin, mean energy of all bins collectively, mean energy of the largest energy bin in each band, etc.) and a variance of energy parameter (e.g., variance of energy of each bin, variance of energy of the largest energy bin, variance of energy of all bins collectively, variance of energy of the largest energy bin in each band, etc.) are tracked. Tracking these parameters preferably includes storing (e.g., temporarily storing, permanently storing, caching, etc.) a set of their values (e.g., most recent value, an aggregated value based on historical values, an average value, a predicted value, etc.) at any or all of: storage or memory onboard a component of the system (e.g., at the housing, at a user device, etc.); remote storage or memory (e.g., at a remote server); and/or at any other suitable storage. In specific examples, during each of the $1^{st}$ and $3^{rd}$ operation modes, a mean energy of each frequency bin and the variance of energy of each frequency bin is tracked and used to establish at least one of a floor and a ceiling, which are subsequently used to determine one or more vibration intensities in subsequent processes of the method.

Additionally or alternatively, S140 can optionally include comparing one or more of the set of parameters, such as energy parameters and/or any other parameters associated with the audio input (e.g., frequency), with a set of thresholds, which can function to either pass an energy parameter through to subsequent processes of the method or eliminate it from consideration. The thresholds can include any or all of: a set of decibel (dB) thresholds (e.g., minimum dB, maximum dB, etc.); a set of noise thresholds (e.g., maximum noise threshold, minimum noise threshold, etc.), such as a set of motor noise thresholds; a set of sensitivity thresholds (e.g., loudness sensitivity, tonality sensitivity, etc.); a tonality threshold (e.g., as described above); and/or any other suitable thresholds.

In preferred variations, a set of frequency bins associated with the highest energy are compared with a set of thresholds. Additionally or alternatively, any other suitable parameters can be compared with a set of thresholds.

The set of thresholds applied and/or the parameters associated with the thresholds can optionally be determined based on the operation mode of the device. Additionally or alternatively, the set of thresholds and/or parameters can be applied independently of an operation mode and/or otherwise applied.

The thresholds applied and/or the threshold values can be any or all of: different for each bin, the same across all bins, and/or any combination.

The set of thresholds can include a sensitivity threshold. The sensitivity threshold preferably functions to check that the energy parameter(s) could be detected by a user, but can additionally or alternatively perform any other suitable function(s). The sensitivity threshold can be any or all of: selected by a user, such as during onboarding of the user to the device; determined through testing, such as through the application of one or more haptic stimuli and a set user responses indicating whether or not the user felt the stimulation; hard coded (e.g., in firmware of the stimulation device); stored and retrieved (e.g., in a lookup table, at storage of a user device, etc.); predetermined (e.g., constant for all users); and/or otherwise determined.

The sensitivity can refer to any or all of: a sensitivity of sound, such as a minimum level (e.g., volume, loudness, tonality, etc.) of sound that a user would want translated into haptic stimulation; a sensitivity of haptic stimulation, such as a minimum level of haptic stimulation that a user can perceive; and/or any other type of sensitivity. Additionally or alternatively, the sensitivity can be associated with a particular type of sound, such as a tonality. In some variations, for instance, a user can select a sensitivity level associated with tonal sounds in one or more operation modes (e.g., night mode), wherein tonal sounds associated with a parameter (e.g., degree of tonality) above the threshold can be conveyed to the user (e.g., pending other thresholds, independent of other thresholds, etc.). The sensitivity can be constant across all modes, different across modes (e.g., greatest for a night mode, greatest for a music mode, etc.), and/or have any other values.

In some variations, the user chooses from a baseline sensitivity, a low sensitivity, and a high sensitivity during an onboarding process.

In a first set of specific examples, the sensitivity selection is related to a loudness (e.g., in dB) of sounds which pass the sensitivity threshold. This is preferably implemented in the default mode (e.g., $1^{st}$ mode/everyday mode), but can additionally or alternatively be implemented in any other suitable modes.

In a second set of specific examples, additional or alternative to the first set of specific examples, the user can make a sensitivity selection associated with the tonality of sound required to pass a threshold. This is preferably implemented in the night mode and/or an emergency mode, but can additionally or alternatively be implemented in any other suitable modes.

The set of thresholds can optionally additionally or alternatively include a motor noise threshold, which can function to mitigate feedbacking, such as what occurs when motor noise is picked up by a microphone of the device and causes runaway feedback. The value(s) associated with the motor noise threshold are preferably predetermined based on testing of the motors in an isolated environment (e.g., a quiet box) and detecting the sound level of the motor noise alone. The motor noise threshold can be set at this sound level such that energy parameters associated with a sound less than this threshold are eliminated from further processing. The motor noise threshold can be a collective threshold for all bins, specific to a particular frequency bin, independent of frequency bins, and/or otherwise associated.

Further additionally or alternatively, the set of thresholds can include a tracked value threshold based on a tracked value (e.g., running mean) associated with the energy parameter (and/or any other parameters). The tracked value threshold can function, for instance, to eliminate constant noises in the environment of the user (e.g., constant hum of an AC unit) from being converted into haptic stimulation. In some variations, the $3^{rd}$ threshold specifies that the running energy mean (e.g., of a frequency bin) must be exceeded (e.g., by a predetermined threshold) in order for the energy parameter to pass through to further processing. Additionally or alternatively, the $3^{rd}$ threshold can be otherwise implemented. In a set of specific examples, the tracked value threshold is checked in the $1^{st}$ and $3^{rd}$ modes, but not in the $2^{nd}$ mode. Additionally or alternatively, the tracked value threshold can be checked in any suitable modes or in no modes.

Further additionally or alternatively, the set of thresholds can include a tonality threshold, wherein bins and/or other portions of the audio input having a tonality below a predetermined threshold are eliminated from further processing and/or actuation. This threshold is preferably implemented in a night mode, but can additionally or alternatively be implemented in any other suitable modes.

In a first variation, S140 includes determining a set of maximum energy parameters associated with the organized bins and checking the set of maximum energy parameters against a set of thresholds, wherein in an event that the energy parameters do not satisfy (e.g., exceed) the thresholds, the maximum energy parameters are eliminated from further consideration in subsequent processes of the method.

In a first set of specific examples associated with an everyday operation mode and/or a music mode, the set of thresholds includes any or all of: a motor noise threshold (e.g., hardcoded/predetermined and constant among all bins), a running mean of energy for each bin (e.g., calculated for each bin), and a predetermined loudness threshold determined based on a user preference (e.g., loudness sensitivity level selected by the user). Additionally or alternatively, the thresholds can include any other suitable thresholds and/or can be implemented in any other modes (e.g., night mode).

In a second set of specific examples associated with a night operation mode, the predetermined loudness threshold is replaced with a tonality threshold and/or a sound type threshold (e.g., corresponding to a baby crying), which can optionally be determined based on a user preference (e.g., tonality sensitivity level selected by the user).

Additionally or alternatively, the tonality threshold and/or sound type threshold can be used in conjunction with a loudness threshold, any other modes can implement a tonality threshold and/or a sound type threshold, and/or the modes can be otherwise implemented.

4.6 Method: Determining a Set of Stimulation Locations Based on the Collective Set of Energy Parameters S150

The method 100 can include determining a set of stimulation locations based on the collective set of energy parameters S150, which functions to determine where (e.g., at which actuators) to stimulate the user and/or at what intensities to actuate the actuators (e.g., in an event of illusion-based stimulation).

S150 is preferably performed in response to S140, but can additionally or alternatively be performed in absence of S140, as part of S140 and/or concurrently with S140, prior to S140, multiple times, and/or at any other suitable times.

The stimulation locations can be actual stimulation locations which correspond to areas proximal the set of actuators (e.g., in contact with, underneath, above, etc.); virtual locations based on illusion-based haptic effects; and/or any other suitable locations. In some variations, the locations for the $2^{nd}$ mode correspond to locations proximal to haptic actuators, whereas the locations for the $1^{st}$ and $3^{rd}$ modes can correspond to either locations proximal to haptic actuators or locations in-between haptic actuators, which are stimulated through illusion-based encoding.

The stimulation locations are preferably determined based on one or more virtual mappings, which map the range of possible frequencies to a virtual location space corresponding to the region of the housing which can actually apply stimulation and/or apply stimulation through illusion stimulation. The virtual location space can be 1-dimensional (e.g., corresponding to single actuator), 2-dimensional (e.g., for a strip of actuators, in a wristband housing, etc.), 3-dimensional (e.g., for a vest, etc.), and/or can include any other arrangement of any suitable dimensionality. The mapping can be linear, logarithmic, and/or any other suitable mapping.

The number of potential stimulation locations can be any or all of: equal to the number of actuators, greater than the number of actuators (e.g., in illusion-based encoding), equal to the number of frequency bins, and/or can include any number of suitable potential locations. The subset of potential stimulation locations selected for stimulation preferably correspond to the frequencies associated with the highest energy or energies. The set of one or more locations can include any or all of: a single location associated with the highest energy; a predetermined number of locations (e.g., corresponding to the 2 highest energy bins); a dynamically determined number of locations, such as any number of locations associated with a frequency having an energy above a predetermined threshold; and/or any other suitable number of locations can be selected.

Selecting the stimulation locations can optionally include applying a sparsity constraint, which functions to select a predetermined set of multiple actuators to apply stimulation for each window of audio input. The sparsity constraint is preferably only implemented in the $2^{nd}$ mode, but can additionally or alternatively be implemented in any mode, combination of modes, and/or not implemented at all. In some variations, for instance, a predetermined number of haptic actuators (e.g., 2 out of 4 for a haptic wristband, less than 2, greater than 2, 50%, less than 50%, greater than 50%, etc.) corresponding to the highest energy frequencies (e.g., through a bin to band mapping as described below) are selected for haptic actuation. Additionally or alternatively, a spatial pattern can be used to select locations when implementing a sparsity constraint. Haptic actuators can be selected in an alternating fashion, a directional fashion (e.g., the left half, the right half, etc.), and/or based on any other pattern or rule.

In some variations, such as those implemented in either a $1^{st}$ or a $3^{rd}$ operation mode, one or more locations of haptic stimulation are chosen based on a set of one or more frequencies associated with high energy and a mapping from the set of frequencies to a virtual location space spanning a region of stimulation (e.g., wristband). In specific examples, the frequency bin having the highest energy is mapped to the virtual location space.

In some variations, such as those implemented in the $2^{nd}$ operation mode, the set of frequency bins are first mapped to a set of bands, wherein the set of bands is preferably equal to the number of actuators but can additionally or alternatively be less than the number of actuators, greater than the number of actuators, or have any other number. The band having a bin with the highest energy is chosen for stimulation, and the stimulation location is at an actuator corresponding to the band. Additionally, in the event of a sparsity constraint, one or more other actuators can be chosen. Further additionally or alternatively, locations between actuators can be selected for stimulation (e.g., illusion stimulation).

Additionally or alternatively, locations can be predetermined and/or otherwise determined.

4.7 Method: Assigning a Vibration Intensity to a Set of One or More Haptic Actuators S160

The method 100 can include assigning a vibration intensity to a set of one or more haptic actuators S160, which functions to enable appropriate (e.g., discernible, interpretable, enjoyable, etc.) haptic stimulation to be applied to the user. Additionally or alternatively, the vibration intensities determined in S160 can function to enable discrepancies to be felt between different actuators, between the same actuator at different times, take into account the general sound environment of the user, and/or incorporate any other factors.

The vibration intensity preferably refers to an amplitude of vibration of an actuator, but can additionally or alternatively refer to any other suitable parameters. In a set of specific examples, the actuators include LRAs, wherein the LRAs can vibrate at a fixed frequency (e.g., a frequency between 100 and 200 Hz, a frequency less than 100 Hz, a frequency greater than 200 Hz, etc.) and a variable amplitude. Additionally or alternatively, the intensity can refer to any other parameters and/or the actuators can be otherwise controlled.

S160 is preferably performed in response to S150 but can additionally or alternatively be performed in absence of S150, as part of S150 and/or concurrently with S150, prior to S150, multiple times, and/or at any other suitable times.

The vibration intensity is preferably based on an energy parameter associated with the location and a vibration mapping associated with the haptic actuator(s) to be actuated. The vibration mapping can be any or all of: a linear mapping, a logarithmic mapping, a mapping based on an algorithm and/or a deep learning model, a lookup table, and/or any other suitable mapping.

The vibration intensities assigned to the set of actuators are preferably within the performance specification parameters of the set of actuators. These parameters can include a minimum vibration intensity, such as a zero intensity (e.g., "off" state), a maximum vibration intensity (e.g., maximum drivable amplitude based on the device specifications such as the actuator specifications and/or the motor specifications), and any number of vibration intensities in between, wherein the vibration intensity is determined based on the mapping. Additionally or alternatively, the parameters can include a subset of these and/or any other intensity options or performance specification parameters.

In specific examples, for instance, an integer value (e.g., on a scale from 0 to 255, on a scale from 0 to 10, on any suitable scale, etc.) is determined based on the corresponding energy of the audio, wherein the integer value is mapped to an amplitude for the actuator based on the available amplitude range for the actuator.

In some variations, the vibration intensities assigned to the actuators are predetermined. For instance, a static intensity value can be assigned to the actuator(s) selected based on a location for stimulation corresponding to the maximum energy.

Any or all of the vibration intensities can additionally or alternatively be selected based on one or both of a floor and a ceiling such as any or all those referenced previously. The floor and ceiling can function, for instance, to determine a minimum floor-to-ceiling gap that, when enforced, functions to apply appropriate yet discernible haptic stimulation through the selection of vibration intensity values. Additionally, the floor and ceiling can function a user to interpret a change in sound in his or her environment (e.g., sound growing louder, sound getting quieter, etc.), determining a mapping from the energy parameter to the intensity, and/or be otherwise used.

The ceiling preferably reflects the loudness (e.g., in dB) of the loudest sound detected recently and/or for all time, and is replaced when a sound having a loudness greater than the ceiling is heard. The ceiling is further preferably decremented in value (e.g., by a predetermined step value, by a dynamically determined value, etc.) with time until either a minimum ceiling value (e.g., predetermined minimum ceiling value) and/or floor-to-ceiling gap (e.g., 10 dB) is reached or a sound louder than the ceiling is detected and subsequently used to replace the ceiling value. Alternatively, the ceiling can maintain a static value until it is replaced with a new static value.

The floor can be determined based on any or all of the following: a running mean energy parameter (e.g., as described above); a value that maps to a minimum vibration intensity that a user can detect (e.g., based on the user's sensitivity level); the quietest non-zero sound detected recently by the system; a motor noise level of the set of actuators; and/or any other suitable parameters.

The floor and/or ceiling can be set on a bin-by-bin basis, shared for multiple and/or all bins, shared for all users, and/or any combination of these. Additionally or alternatively, either or both of the floor and ceiling can be static, dynamic, and/or any combination of both.

The energy parameters can be mapped to a floor-to-ceiling scale that ranges from the floor to the ceiling through any suitable mapping (e.g., linear, logarithmic, etc.) or algorithm(s). A value in the floor-to-ceiling scale is preferably mapped to a value in the vibration intensity scale through a logarithmic mapping, such that a change in energy is more pronounced for high values of energy. Additionally or alternatively, any other suitable mapping can be implemented.

In some variations, such as those in which the system is operating in the $1^{st}$ or $3^{rd}$ operation modes, an adaptive floor and ceiling are determined, wherein the floor is adjusted based on a value of a running mean on a bin-to-bin basis, and the ceiling is determined on a global basis based on the recently loudest sound received.

In some variations, such as those in which the system is operating in the $2^{nd}$ operation mode, a static floor and a dynamic ceiling are determined.

In some variations, the floor-to-ceiling range is used to determine a scalar value with which to scale a mapping from the energy parameter to the intensity. In specific examples, for instance, the size of the floor-to-ceiling range dictates how large of a range of sound is being mapped to the range of the actuators, such that if the floor-to-ceiling range is small, an increase in sound level can be relatively small and still elicit a strong vibration, whereas if the floor-to-ceiling range is large relatively, an increase in sound needs to be greater to elicit a stronger vibrations. This scalar factor can optionally additionally or alternatively be determined based on an identified sound type (e.g., beep, tonal sound, speech, with a neural network, etc.) for intensity boosting and/or suppression. In examples, for instance, important sounds can have an increased scalar factor (e.g., double). Additionally or alternatively, floor-to-ceiling ranges and/or scalar factors can be otherwise implemented.

S160 can additionally or alternatively include determining a set of weighted intensities for adjacent actuators, such as in the process of producing illusion stimulation. In an event, for instance, that a location selected for stimulation is between two actuators, S160 can include determining a set of weighted intensities for the adjacent actuators such that the user "feels" a stimulation at that the location, wherein the difference in weighting of the intensities drives the location of perceived stimulation closer to the actuator with the higher intensity (e.g., and appears in the middle when the intensities have the same value). Additionally or alternatively, the intensities can be otherwise determined. This can optionally further be modulated by an additional gain factor to represent the energy. In specific examples, for instance, if a frequency corresponds to a location (e.g., a virtual location) halfway between a first motor and a second motor, the first and second motors are prescribed to have equal vibration intensities, wherein the equal vibration intensities are scaled based on the relevant energy value for that frequency/location.

Further additionally or alternatively, any or all of the haptic actuators can be assigned to a particular feature or type of sound, such as a beat during music. In specific examples of an operation mode such as the $2^{nd}$ operation mode, for instance, one of the set of haptic actuators is configured to provide stimulation in time with a beat of the music at any suitable intensity (e.g., constant, dynamic, matching that of the music, etc.). Additionally or alternatively, a beat or other feature can be otherwise conveyed to the user, and/or the music mode can be otherwise implemented (e.g., to bring out as much detail in the music as possible across a desired frequency range corresponding to the music).

In a first variation (e.g., in a $1^{st}$ mode, in a $3^{rd}$ mode, etc.), S160 includes determining a set of vibration intensity values based on at least one maximum energy parameter and an adaptive floor and ceiling, wherein the set of vibration intensity values are determined based on a non-linear mapping (e.g., exponential, logarithmic, etc.) from a floor-ceiling space to an intensity space. In specific examples, determining the intensity values includes determining a set of weighted intensities for adjacent actuators in the event of illusion-based stimulation.

In a second variation (e.g., in a $2^{nd}$ mode), S160 includes determining a set of vibration intensity values based on a predetermined number of maximum energy parameters (e.g., two largest energy parameters), a static floor, and a dynamic ceiling, wherein the set of vibration intensity values are determined based on a linear mapping from a floor-ceiling space to an intensity space.

4.8 Method: Stimulating a User at the Set of Haptic Locations Based on the Vibration Intensities S170

The method 100 includes stimulating a user at the set of haptic locations based on the vibration intensities S170, which functions to apply the haptic stimulation to the user. The haptic stimulation can be applied with a haptic driver of the system, but can additionally or alternatively be applied with any other suitable components of the system. The haptic stimulation is preferably applied automatically, but can additionally or alternatively be applied in response to a trigger and/or a user input.

4.9 Method: Variations

Figure 7:
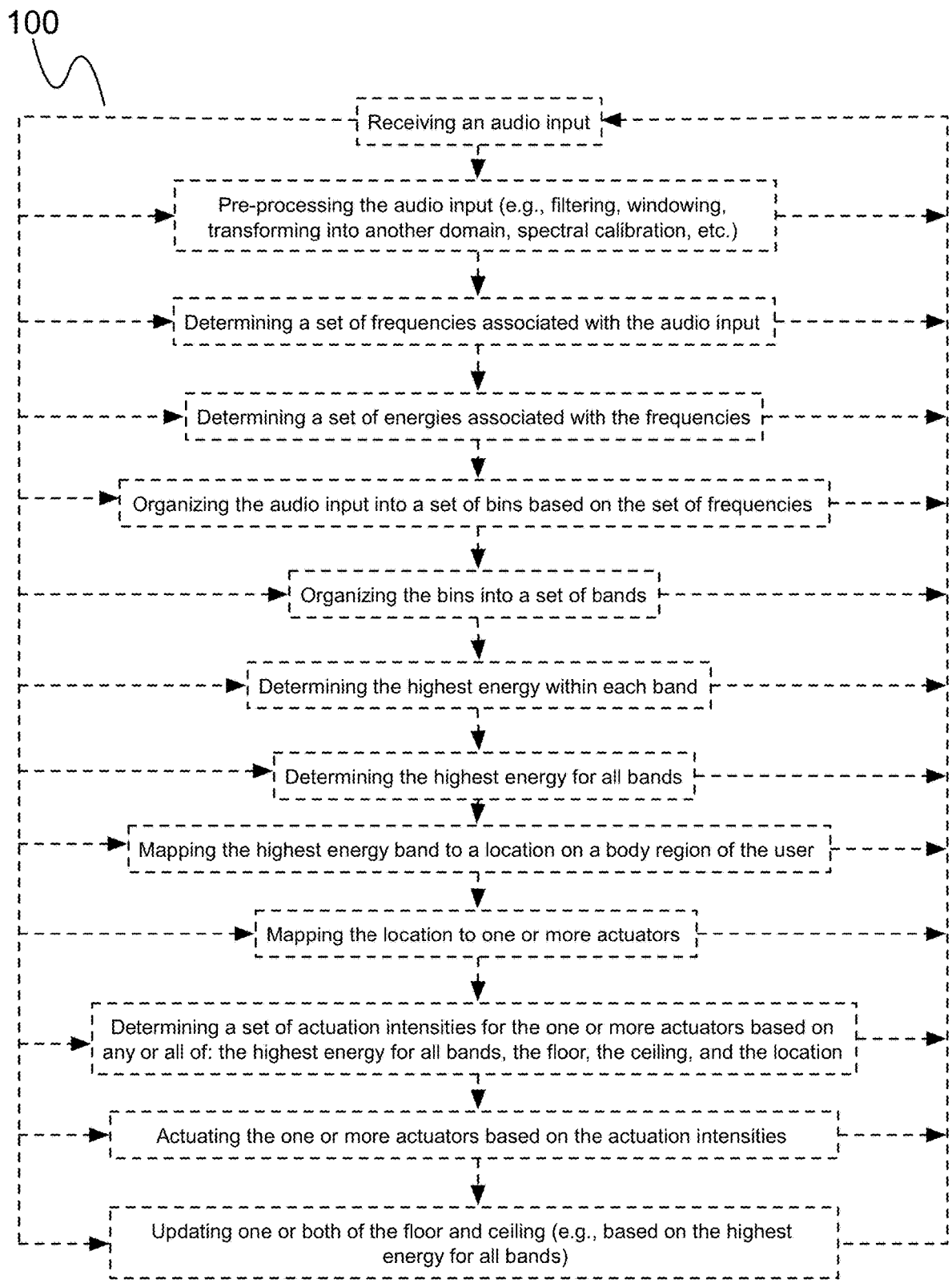
FIG. 7 depicts an example embodiment of implementing the method in one or more operation modes.

In a first set of variations (e.g., as shown in FIG. 7), the method 100 is configured to performed in one of a set of operation modes, which include at least: a $1^{st}$ mode (e.g., an everyday mode), a $2^{nd}$ mode (e.g., a music mode), and a $3^{rd}$ mode (e.g., a night mode). In this variation, for all modes, the method 100 includes a preprocessing step S110 in response to receiving an audio input S105, the preprocessing including: filtering the audio input (e.g., with a comb filter) to eliminate motor noise and its harmonics; windowing the audio input (e.g., with overlapping Hahn windows); and correcting the audio input based on white noise. In this variation, for all modes, the method further includes: determining a set of frequencies of the audio input and a set of energies (e.g., amplitudes) associated with the set of frequencies S120; organizing the audio window into frequency bins, wherein each bin represents a range of frequencies S130; and selecting one or more highest value energies. In the $3^{rd}$ mode, the method 100 further preferably includes ensuring that this energy or energies are associated with tonal sounds (e.g., through a Wiener entropy calculation and comparison with a tonality threshold). The method 100 further includes passing the energy or energies through a set of thresholds, wherein in the $1^{st}$ and $3^{rd}$ operation modes, the set of thresholds includes a sensitivity threshold, a motor noise threshold, and a running energy mean threshold. In the $2^{nd}$ operation mode, the set of thresholds includes the sensitivity threshold and the motor noise threshold. In the $1^{st}$ and $3^{rd}$ operation modes, S150 includes choosing one or more locations of haptic stimulation based on a frequency bin associated with the highest energy and mapping the associated frequency to a virtual location space spanning a region of stimulation (e.g., wristband). In the $2^{nd}$ operation mode, S150 includes mapping the set of frequency bins to a set of bands, wherein the set of bands is preferably equal to the number of actuators but can additionally or alternatively be less than the number of actuators, greater than the number of actuators, or have any other number. The band having a bin with the highest energy is chosen for stimulation, and the stimulation location is at an actuator corresponding to the band. Additionally, in the event of a sparsity constraint, one or more other actuators can be chosen, such as a second actuator corresponding to the second highest energy. In the $1^{st}$ and $3^{rd}$ operation modes, S160 includes determining a set of vibration intensity values based on at least one maximum energy parameter and an adaptive floor and ceiling, wherein the set of vibration intensity values are determined based on a non-linear mapping (e.g., exponential, logarithmic, etc.) from a floor-ceiling space to an intensity space. In specific examples, determining the intensity values includes determining a set of weighted intensities for adjacent actuators in the event of illusion-based stimulation, wherein a difference in the weights moves the perceived location closer toward the actuator associated with the higher weight (thereby allowing a discernment in locations between motors to be perceived). In the $2^{nd}$ operation mode, S160 includes determining a set of vibration intensity values based on a predetermined number of maximum energy parameters (e.g., two largest energy parameters), a static floor, and a dynamic ceiling, wherein the set of vibration intensity values are determined based on a linear mapping from a floor-ceiling space to an intensity space. For all modes, S170 include stimulation a user in accordance with the location(s) and intensity values.

In a first set of examples of an operation mode (e.g., everyday mode), the method includes any or all of: receiving an audio input; filtering (e.g., with comb filter) the audio input; transforming the audio input into the frequency domain (e.g., with FFT); correcting the audio input based on a white noise spectral calibration; determining a set of frequencies of the audio input and a set of energies associated with the set of frequencies; organizing the audio input into a set of bins based on the set of frequencies; determining a maximum energy associated with each bin; comparing the maximum energy for each bin (and/or any other parameters) with a set of thresholds, wherein the set of thresholds includes: a bin-independent (same for all bins) predetermined motor noise threshold for all bins, a bin-dependent threshold equal to the running energy mean (e.g., average energy of bin over time) for each bin, and a bin-independent predetermined loudness sensitivity threshold (e.g., selected by a user); based on the comparison, either further processing the bin (e.g., if it exceeds all thresholds, if it exceeds a majority of the thresholds, it if exceeds at least one threshold, etc.) or eliminating it from further processing; with the remaining bins, determining the bin associated with the highest absolute energy; in response to selecting the bin with the highest energy, optionally updating the ceiling value associated with the bin based on the highest energy parameter (e.g., increasing the ceiling value to the energy parameter if the current ceiling is lower than the energy, decreasing the ceiling value if the energy parameter is lower than the ceiling, etc.); mapping the bin to a location (e.g., virtual location) on the body region of the user; determining a set of one or more actuators associated with the location; determining an actuator intensity and/or stimulation pattern for each of the set of one or more actuators based on the highest energy parameter and optionally any or all of the location, a floor value associated with the bin, and a ceiling value associated with the bin; and actuating the set of one or more actuators according to the stimulation pattern.

Additionally or alternatively, determining the subset of bins can include determining a bin associated with the highest energy relative to a floor of the bin.

In a second set of examples of an operation mode (e.g., night mode), the method includes any or all of the processes in the first set of examples, wherein the set of thresholds additionally or alternatively (e.g., instead of a loudness sensitivity threshold) includes a tonality threshold, wherein all sounds exceeding a tonality threshold (e.g., a minimum tonality) are actuated (e.g., even if they are not loud which can occur for instance in an event a smoke alarm is going off and the haptic device is under a user's pillow). The tonality threshold can optionally override and/or replace any or all of the other thresholds, or can be used in conjunction with (e.g., all thresholds required to be exceeded). In this operation mode, additionally or alternatively, other types of sounds (e.g., sounds corresponding to children such as babies crying) can be configured to be actuated, such as based on user preferences (e.g., parents with a newborn can permit child sounds to be actuated).

In a third set of examples of an operation mode (e.g., music mode), the method includes any or all of: receiving an audio input; filtering (e.g., with comb filter) the audio input; transforming the audio input into the frequency domain (e.g., with FFT); correcting the audio input based on a white noise spectral calibration; determining a set of frequencies of the audio input and a set of energies associated with the set of frequencies; organizing the audio input into a set of bins based on the set of frequencies; organizing the set of bins into a set of bands, wherein the number of bands is equal to the number of actuators; determining a maximum energy associated with each band; optionally comparing the maximum energy for each band (and/or any other parameters) with a set of thresholds and either further processing the band (e.g., if it exceeds all thresholds, if it exceeds a majority of the thresholds, it if exceeds at least one threshold, etc.) or eliminating it from further processing; with the remaining bands, optionally updating the ceiling value associated with the highest energy bin based on the highest energy parameter (e.g., increasing the ceiling value to the energy parameter if the current ceiling is lower than the energy, decreasing the ceiling value if the energy parameter is lower than the ceiling, etc.); determining an actuator intensity and/or stimulation pattern for each of the set of one or more actuators associated with (e.g., directly mapped to) a remaining band based on the highest energy parameter in the band and optionally any or a floor value associated with the corresponding bin, and a ceiling value associated with the corresponding bin; and actuating the set of one or more actuators according to the stimulation pattern.

In a second set of variations, additional or alternative to the first, the method 100 is performed with one or more operation modes which take into account particular types of sounds and/or particular characteristics of sounds, such as, but not limited to speech, beeps and/or other tonal sounds, and/or any other sounds.

In a third set of variations, additional or alternative to the first, the method 100 is performed for the purpose of eliminating and/or reducing a user's experience with tinnitus. In specific examples, the haptic wristband device is used stimulate the user through the set of actuators in accordance with (e.g., simultaneously with, contemporaneously with, etc.) audio heard (e.g., organically, as part of audio therapy such as tone-based therapy, etc.) by the user.

Additionally or alternatively, the method 100 can include any other suitable process(es).

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method for providing tactile stimulation to a user at a tactile stimulation device, the method comprising:
   receiving an audio signal;
   processing the audio signal to determine a set of parameters, the set of parameters comprising:
      a set of frequencies;
      a set of energies;
   organizing the set of parameters based on the set of frequencies;
   selecting a subset of energies from the set of energies based on the organized set of parameters;
   refining the subset of energies based on a set of thresholds, wherein the set of thresholds comprises a tonality threshold;
   determining a highest energy of the subset of energies, wherein the highest energy is selected from the refined subset of energies;
   determining a location of the tactile stimulation based on the highest energy;
   selecting a subset of actuators from the set of actuators of the tactile stimulation device based on the location; and
   actuating the subset of actuators to produce the tactile stimulation.

2. The method of claim 1, further comprising determining a set of actuation intensities associated with the subset of actuators, wherein the subset of actuators is actuated based on the set of actuation intensities.

3. The method of claim 2, wherein the set of actuation intensities is determined based on the highest energy.

4. The method of claim 3, wherein the set of actuation intensities is further determined based on a ceiling value associated with the subset of actuators.

5. The method of claim 4, further comprising, in response to actuating the subset of actuators, updating the ceiling value based on the highest energy.

6. The method of claim 1, wherein organizing the set of parameters based on the set of frequencies comprises organizing the set of parameters into a set of predetermined groupings based on the set of frequencies.

7. The method of claim 6, wherein each of the subset of energies is associated with a grouping of the set of groupings.

8. The method of claim 7, wherein each of the set of predetermined groupings is associated with a predetermined frequency range.

9. The method of claim 1, wherein refining the subset of energies based on the tonality threshold comprises eliminating energies from the subset of energies which have a tonality below the tonality threshold.

10. A system for providing tactile stimulation to a user, the system comprising:
a tactile stimulation device, the tactile stimulation device comprising:
a set of actuators onboard the tactile stimulation device;
an audio sensing device;
a processing subsystem coupled to the tactile stimulation device, the processing subsystem configured to:
receive an audio signal from the audio sensing device;
process the audio signal to determine a set of parameters, the set of parameters comprising:
a set of frequencies; and
a set of energies;
organize the set of parameters based on the set of frequencies;
select a subset of energies from the set of energies based on the organized set of parameters;
determine a highest energy of the subset of energies; and
select a subset of actuators from the set of actuators based on the highest energy;
determine a location of the tactile stimulation, wherein the subset of actuators is further determined based on the location and wherein the tactile stimulation is produced in accordance with an illusion-based haptic effect, wherein the location is a virtual location arranged between the subset of tactile actuators:
a control subsystem onboard the tactile stimulation device and in communication with the processing subsystem, wherein the control subsystem is configured to:
actuate the subset of actuators to produce the tactile stimulation.

11. The system of claim 10, wherein the processing subsystem is arranged onboard the tactile stimulation device.

12. The system of claim 10, wherein the processing subsystem is further configured to determine a set of actuation intensities for the subset of actuators based on the highest energy.

13. The system of claim 12, wherein the set of actuation intensities is further determined based on a ceiling value associated with the subset of actuators.

14. The system of claim 10, wherein organizing the set of parameters based on the set of frequencies comprises organizing the set of parameters into a set of predetermined groupings based on the set of frequencies.

15. The system of claim 14, wherein each of the subset of energies is associated with a grouping of the set of predetermined groupings.

16. The system of claim 15, wherein each of the set of predetermined groupings is associated with a predetermined frequency range.

* * * * *